(12) United States Patent
Tadano

(10) Patent No.: US 7,221,120 B2
(45) Date of Patent: May 22, 2007

(54) ROBOT HAND

(75) Inventor: Hiroyuki Tadano, Nara (JP)

(73) Assignee: Sharp Kabushiki Kaisha, Osaka (JP)

( * ) Notice: Subject to any disclaimer, the term of this patent is extended or adjusted under 35 U.S.C. 154(b) by 0 days.

(21) Appl. No.: 11/292,907

(22) Filed: Dec. 1, 2005

(65) Prior Publication Data
US 2006/0158146 A1    Jul. 20, 2006

(30) Foreign Application Priority Data
Dec. 3, 2004    (JP) .............. 2004-351481

(51) Int. Cl.
*G05B 19/10* (2006.01)

(52) U.S. Cl. ............ 318/567; 318/568.16; 318/568.21; 700/264

(58) Field of Classification Search ................ 318/567, 318/568.12, 568.16, 568.21; 700/264
See application file for complete search history.

(56) References Cited

U.S. PATENT DOCUMENTS

| | | | | |
|---|---|---|---|---|
| 4,957,320 A | * | 9/1990 | Ulrich | 294/106 |
| 5,200,679 A | * | 4/1993 | Graham | 318/568.16 |
| 5,378,033 A | * | 1/1995 | Guo et al. | 294/116 |

FOREIGN PATENT DOCUMENTS

| | | |
|---|---|---|
| JP | 09-079213 | 3/1997 |
| JP | 2001-287182 | 10/2001 |

* cited by examiner

*Primary Examiner*—Rina Duda
(74) *Attorney, Agent, or Firm*—David G. Conlin; David A. Tucker; Edwards Angell Palmer & Dodge LLP

(57) ABSTRACT

A robot hand has a plurality of fingers and is provided, at a location at which the robot hand touches an object, with a moving means for touching the object and moving the object. The moving means is provided to the palm side of the robot hand and/or the finger pad side of the robot hand.

6 Claims, 25 Drawing Sheets

ROBOT HAND

BACKGROUND OF THE INVENTION

This application claims priority under 35 U.S.C. § 119(a) on Patent Application No. 2004-351481 filed in Japan on Dec. 3, 2004, the entire contents of which are hereby incorporated by reference.

The present invention relates to a robot hand that can perform manual procedures and the like by driving a plurality of fingers.

The device disclosed in, for example, JP 2001-287182A is an example of a conventional device of this type. Here, a drive-source motor is provided to joints of the fingers, a belt bridges an output shaft of the motor and a rotating shaft of the joint, and the rotation of the output shaft of the motor is transmitted to the rotating shaft of the joint via the belt, thereby rotating the joint. These motors and belts are provided to each joint in the finger, rotating each joint and thereby bending and extending the finger.

The degree of freedom of the fingers increases if each joint in the fingers is rotated independently. Complex operation of the robot hand is therefore possible, enabling not only grasping operations of objects, but also manipulation of grasped objects.

Furthermore, by providing touch sensors and/or force sensors to fingertips and other portions of the robot hand and detecting the grasping force, etc., of the robot hand, the functionality of the robot hand is improved.

However, while a wide variety of designs have been proposed other than the robot hand disclosed in JP 2001-287182A, the movement of robot hands has thus far failed to achieve that of human hands, which means that there exist many things which can be done with a human hand that cannot be done with a robot hand.

For example, in order to move an object 102 on the palm of a robot hand 101 in the direction of an arrow F while the robot hand 101 holds the object 102 as shown in FIG. 32, the robot hand 101 must be made to perform an extremely complex movement, requiring a further increase in the degree of freedom, making it very difficult to realize such a movement. Additionally, an appropriate friction surface with the object 102 needs to be provided to the palm, which creates new problems in terms of the shape, material, and so on of the palm, rendering immediate realization impossible.

Further, while a method is conceivable in which a plurality of robot hands is prepared and the object on the palm of the robot hand is moved through the aid of another robot hand, further problems for consideration would arise, such as analysis of locations on the object for the other robot hand to come in contact with, recognition technology, technology for making a plurality of robot hands work in concord, and so on, rendering immediate realization impossible.

SUMMARY OF THE INVENTION

Accordingly, the present invention has been devised in light of these problems of the conventional art, and it is an object thereof to provide a technically viable robot hand capable of more complex handling of objects.

In order to resolve the problems described above, the robot hand of the present invention is such that a robot hand having a plurality of fingers is provided, at a location at which the robot hand touches the object, with a moving means for touching the object and moving the object.

With such a configuration, providing the moving means to a location such that it touches an object, when an object is grasped by the robot hand, makes it possible to move the object by the moving means while grasping the object, thereby enabling more complex handling of the object. Furthermore, as described below, a belt conveyor or the like may be used as the moving means, whereby viability is very high and control of which is easy.

The robot hand according to the present invention may be configured such that the moving means is provided to the palm side of the robot hand.

The robot hand according to the present invention may be configured such that the moving means is provided to the finger pad side of the robot hand.

With the above configurations, the object grasped by the robot hand can be moved within the hand.

The robot hand according to the present invention may be configured such that a plurality of moving means is provided, and moving speeds of the object by each moving means mutually differ.

The robot hand according to the present invention may be configured such that a plurality of moving means is provided, and moving directions of the object by each moving means mutually differ.

With the above configuration, the object cannot only be transported, but also rotated.

The robot hand according to the present invention may also be configured such that a plurality of moving means is provided, each moving means being provided to mutually non-parallel surfaces of the robot hand.

With this configuration, the object can be moved in a stable manner by each moving means because the moving means touch the object on mutually differing surfaces.

The robot hand according to the present invention may be such that the moving means is a belt conveyor.

The robot hand according to the present invention-may be configured such that the moving means is provided with elastic members which contain a plurality of pressure chambers, traveling waves being formed on the surface of the elastic members through sequential selective expansion of each pressure chamber, and an object, which touches the surfaces of the elastic members, being moved by the traveling waves on the surface of the elastic members.

The robot hand according to the present invention may be configured such that the moving means is provided with a plurality of polymer actuators and elastic members which are placed on the polymer actuators and latched together, traveling waves being formed on the surface of the elastic members through sequential selective extension of each polymer actuator, and an object, which touches the surfaces of the elastic members, being moved by the traveling waves on the surface of the elastic members.

The robot hand according to the present invention may be such that the moving means is a rotatingly driven roller.

DESCRIPTION OF THE PREFERRED EMBODIMENTS

Below follows a detailed description of an embodiment of the present invention with reference to the drawings.

Figure 1:
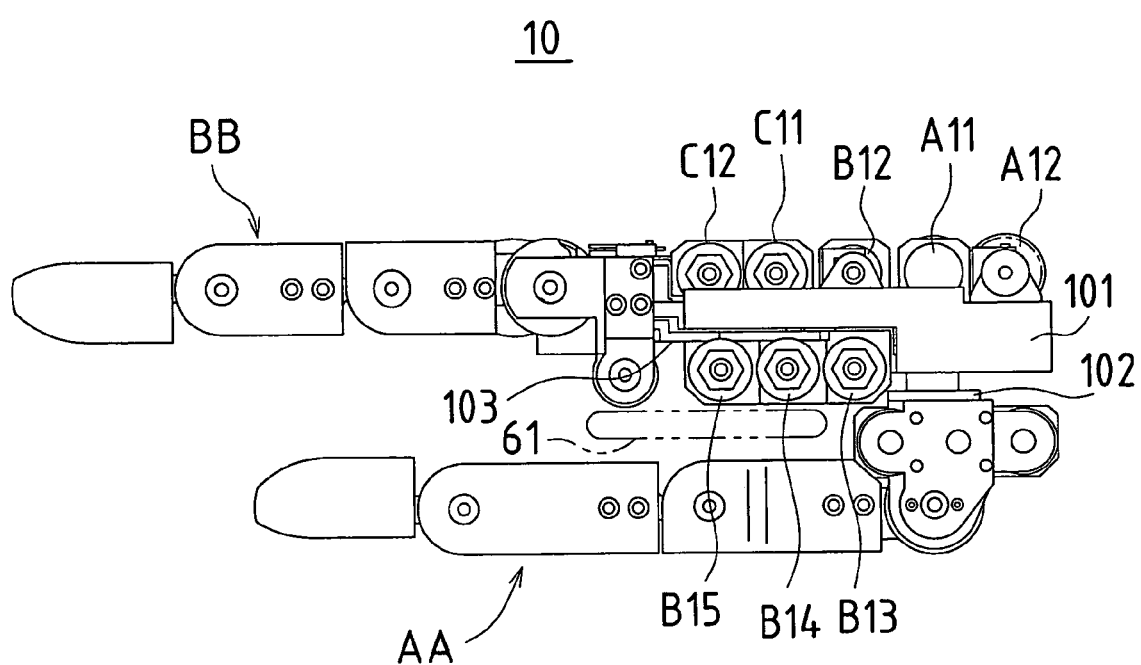
FIG. 1 is a lateral view showing an embodiment of a robot hand according to the present invention.
Figure 2:
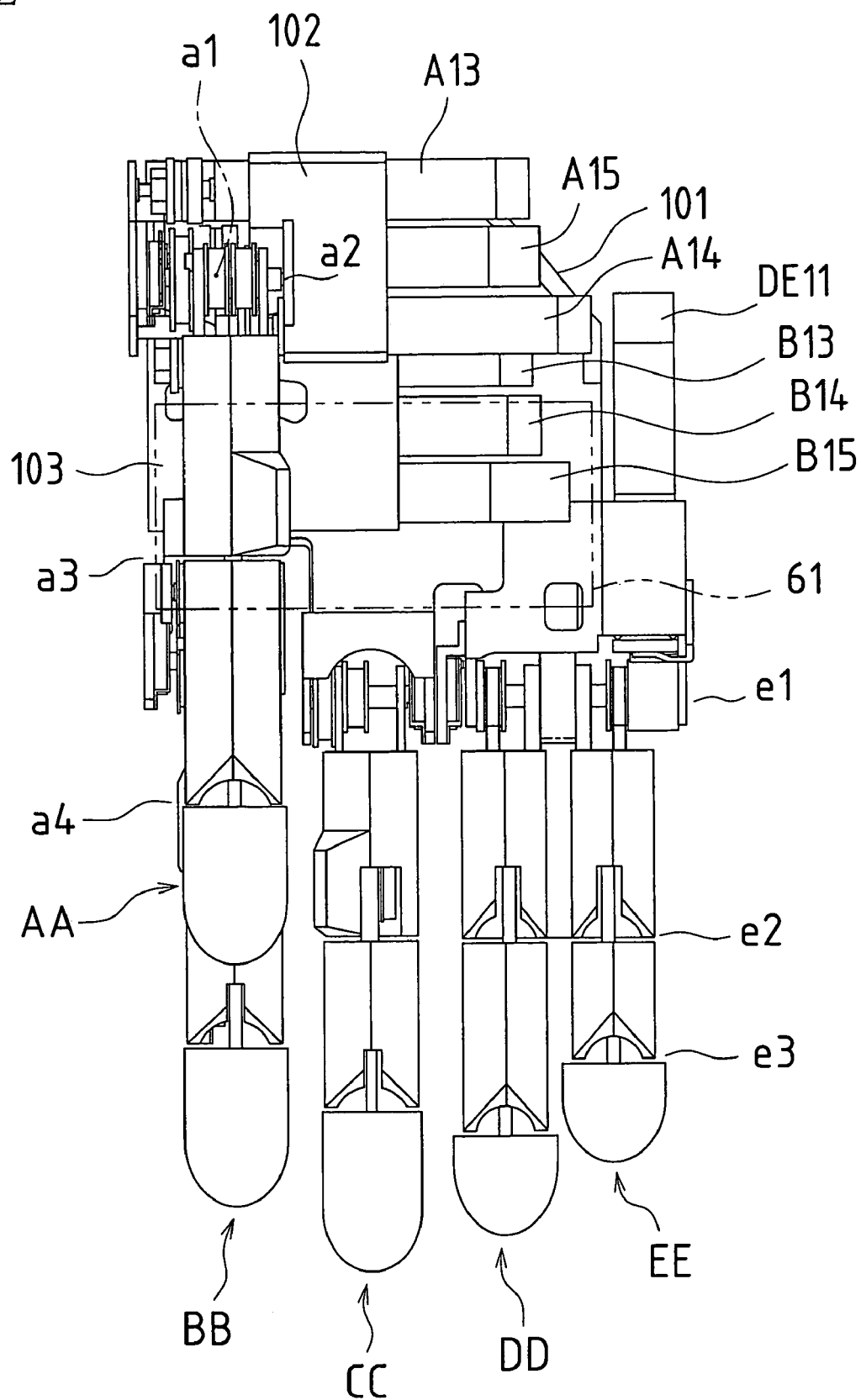
FIG. 2 is a plan view showing the robot hand according to the embodiment shown in FIG. 1 from the palm side.
Figure 3:
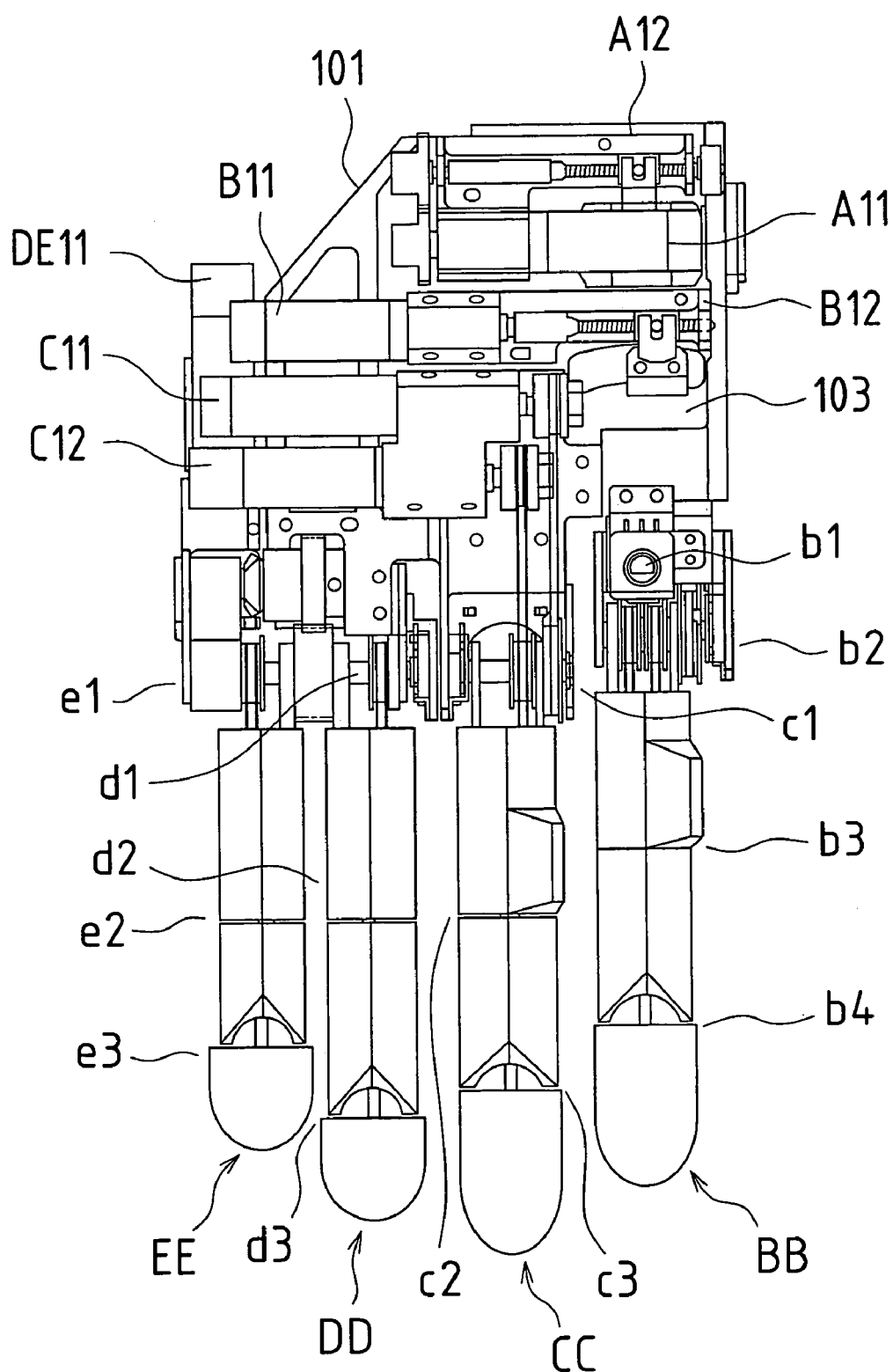
FIG. 3 is a rear view showing the robot hand according to the embodiment shown in FIG. 1 from the back of the hand side.

FIG. 1 is a lateral view showing an embodiment of a robot hand according to the present invention, FIG. 2 is a plan view showing the robot hand according to the present embodiment shown from the palm side, and FIG. 3 is a rear view showing the robot hand according to the present embodiment shown from the back of the hand side.

In the robot hand 10, a main base 101 corresponds to the palm or the back of the hand, a thumb sub base 102 is pivotally supported on the main base 101 such that it rotates parallel to the palm, and a thumb mechanism AA is supported by the thumb sub base 102. An index finger sub base 103 is pivotally supported on the main base 101 such that it rotates parallel to the palm of the hand, and an index finger mechanism BB is supported on the index finger sub base 103. Further, a middle finger mechanism CC, a ring finger mechanism DD, and a little finger mechanism EE are directly supported at the main base 101.

Figure 4:
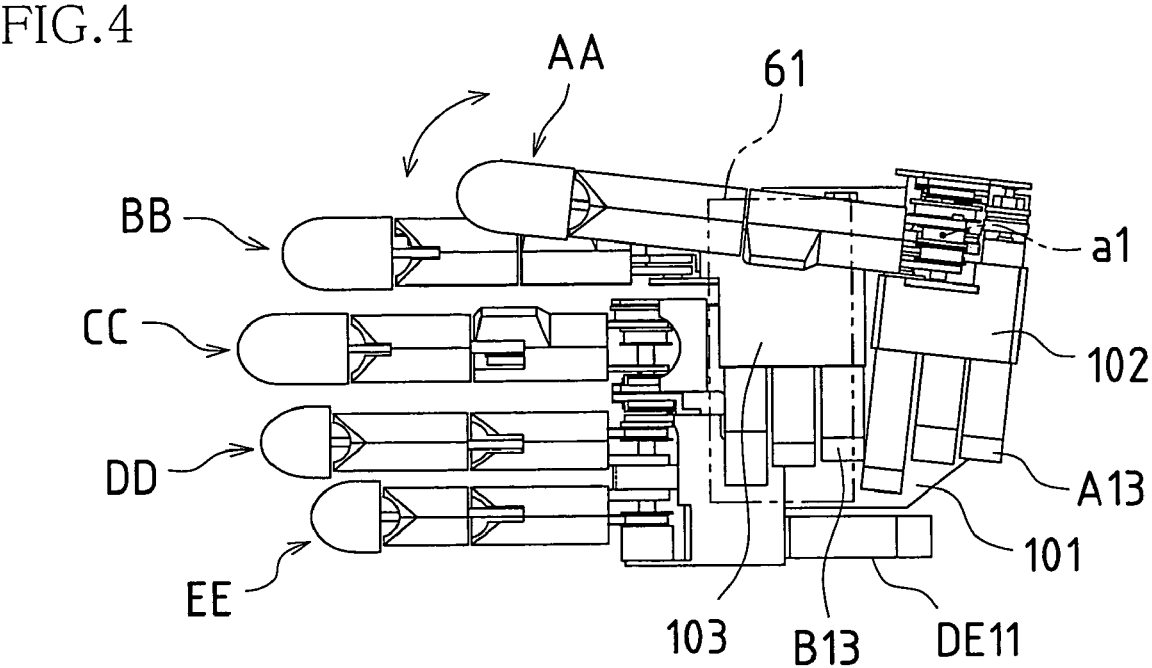
FIG. 4 is a figure showing a rotation operation of a thumb mechanism in the robot hand according to the present embodiment.

A thumb mechanism AA is described next. A motor A11 and a direct-acting rotational transformer A12 are mounted on the main base 101, and rotation of an output shaft of the motor A11 operates the direct-acting rotational transformer A12. The direct-acting rotational transformer A12 rotates the thumb sub base 102 as shown in FIG. 4 parallel to the palm of the hand.

Figure 5:
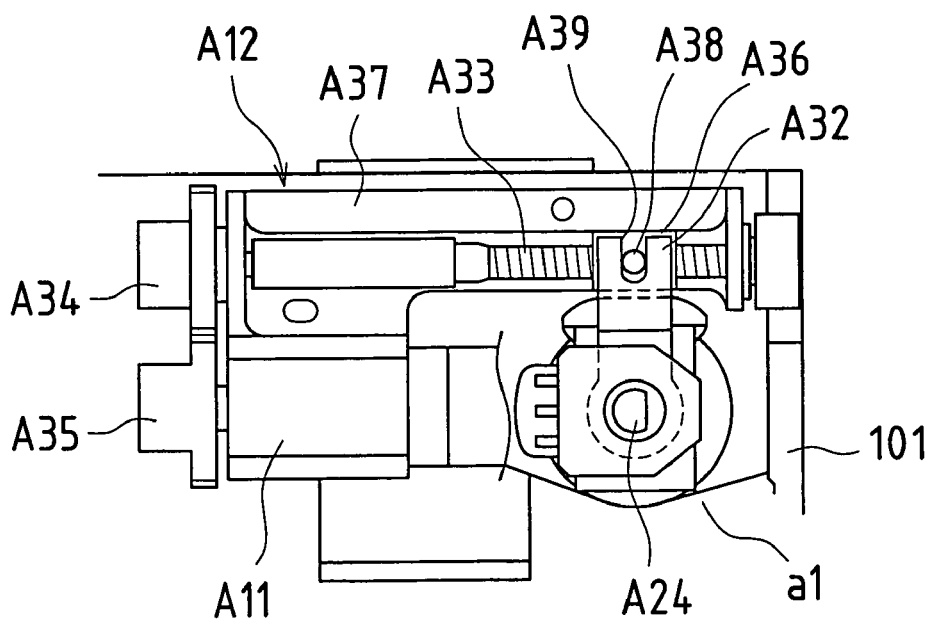
FIG. 5 is a partial cut-away view showing a location where a thumb sub base and main base are linked in the robot hand according to the present embodiment.

Specifically, the direct-acting rotational transformer A12 is made up of a yoke A32, a screw A33, gears A34 and A35, a direct-acting unit A36, and so on, as shown in FIG. 5. The direct-acting rotational transformer A12 transmits the rotation of the output shaft on the motor A11 via the gears A34 and A35 to the screw A33, thereby rotating the screw A33. The thumb sub base 102, which is connected to the yoke A32, is rotated by moving the directing-acting portion A36, which is screwed onto the screw A33, in a rectilinear fashion along the screw A33, thereby moving the yoke A32, which engages the direct-acting unit A36.

Figure 6:
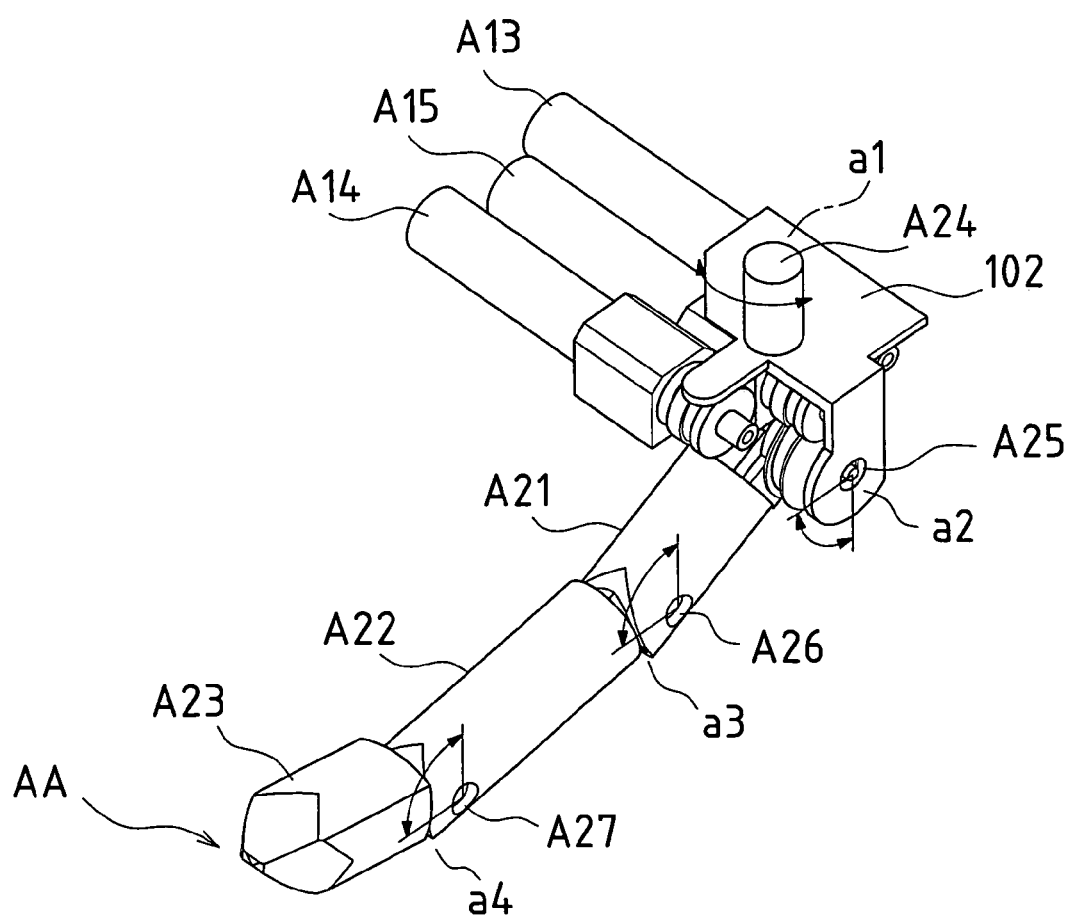
FIG. 6 is a figure showing a bending and extending operation of the thumb in the robot hand according to the present embodiment.

FIG. 6 is a figure showing a bending and extending operation of the thumb in the robot hand according to the present embodiment. Pulleys and wires which are shown in FIG. 7 are omitted from FIG. 6.

As shown in FIG. 6, three motors A13, A14, and A15 are mounted on the thumb sub base 102, and the thumb mechanism AA is bent and extended by rotating joints a2, a3, and a4 by transmitting to joints a2, a3, and a4 of the thumb mechanism AA the rotation of the output shafts of the motors A13, A14, and A15 via their respective rotation transmission mechanisms.

Figure 7:
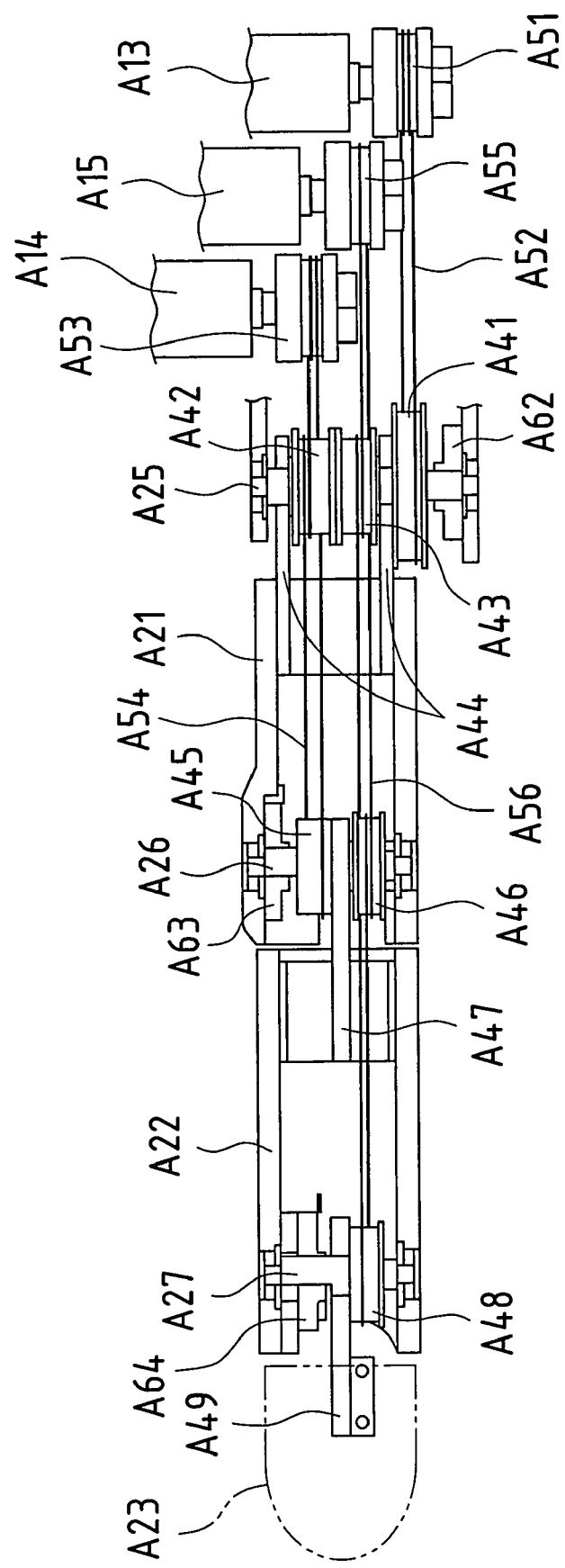
FIG. 7 is a view showing a partial cross-section of motors on the thumb sub base and the thumb mechanism in the robot hand according to the present embodiment.

FIG. 7 is a view showing a partial cross-section of the motors A13, A14, and A15 on the thumb sub base 102 and the thumb mechanism AA.

The thumb mechanism AA is provided with finger barrel portions A21 and A22 and finger tip portion A23 which are linked by the joints a2, a3, and a4 (see FIG. 6).

A shaft A25, which corresponds to the joint a2, is rotatably supported on the thumb sub base 102. The shaft A25 supports in a fixed manner a driven pulley A41 which rotates together with the shaft A25, and rotatably supports idler pulleys A42 and A43 with respect to the shaft A25 and the driven pulley A41. Link portion A44 on the finger barrel portion A21 is connected in a fixed manner to the driven pulley A41.

When the output shaft of the motor A13 rotates, a motor pulley A51 rotates, and the rotation of the motor pulley A51 is transmitted to the driven pulley A41 via the wire A52. The driven pulley A41 thereby rotates together with the shaft A25 and the link portion A44, and the finger barrel portion A21 rotates around the joint a2.

A shaft A26, which corresponds to the joint a3, is supported at the extremity of the finger barrel portion A21. The shaft A26 supports in a fixed manner a driven pulley A45 which rotates together with the shaft A26, and rotatably supports idler pulley A46 with respect to the shaft A26 and the driven pulley A45. Link portion A47 on the finger barrel portion A22 is connected in a fixed manner to the driven pulley A45.

When the output shaft of the motor A14 rotates, a motor pulley A53 rotates, the rotation of the motor pulley A53 is transmitted to the idler pulley A42 and the driven pulley A45 via a wire A54, the idler pulley A42 idles, the driven pulley A45 rotates together with the shaft A26 and the link portion A47, and the finger barrel portion A22 rotates around the joint a3.

Further, a shaft A27, which corresponds to the joint a4, is supported at the extremity of the finger barrel portion A22. This shaft A27 supports in a fixed manner a driven pulley A48 which rotates together with the shaft A27. Link portion A49 on the finger tip portion A23 is connected in a fixed manner to the driven pulley A48.

When the output shaft of the motor A15 rotates, a motor pulley A55 rotates, the rotation of the motor pulley A55 is transmitted to the idler pulley A43, the idler pulley A46, and the driven pulley A48 via a wire A56, the idler pulleys A43 and A46 idles, the driven pulley A48 rotates together with the shaft A27 and the link portion A49, and the finger tip portion A23 rotates around the joint a4.

Accordingly, the thumb mechanism AA individually rotates the four joints a1 through a4 by the four motors A11 and A13 through A15, and has a degree of freedom of 4.

Figure 8:
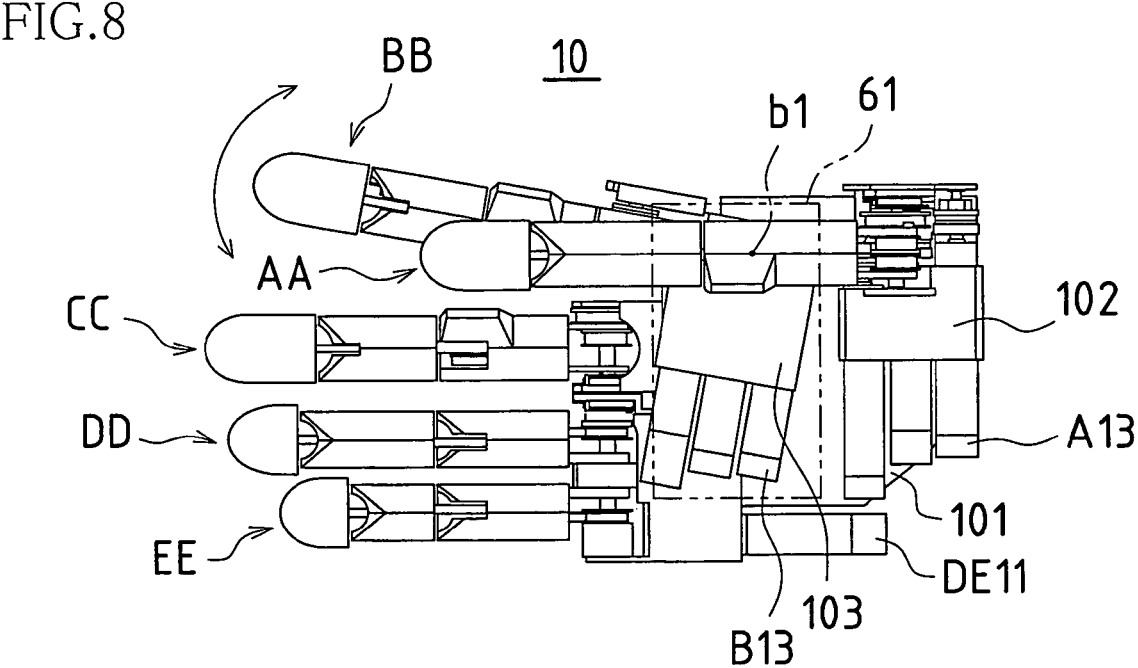
FIG. 8 is a figure showing a rotation operation of an index finger mechanism in the robot hand according to the present embodiment.

An index finger mechanism BB is described next. A motor B11 and a direct-acting rotational transformer B12 are mounted on the main base 101, and rotation of an output shaft of the motor B11 operates the direct-acting rotational transformer B12. The direct-acting rotational transformer B12 rotates the index finger sub base 103 as shown in FIG. 8 parallel to the palm of the hand.

Figure 9:
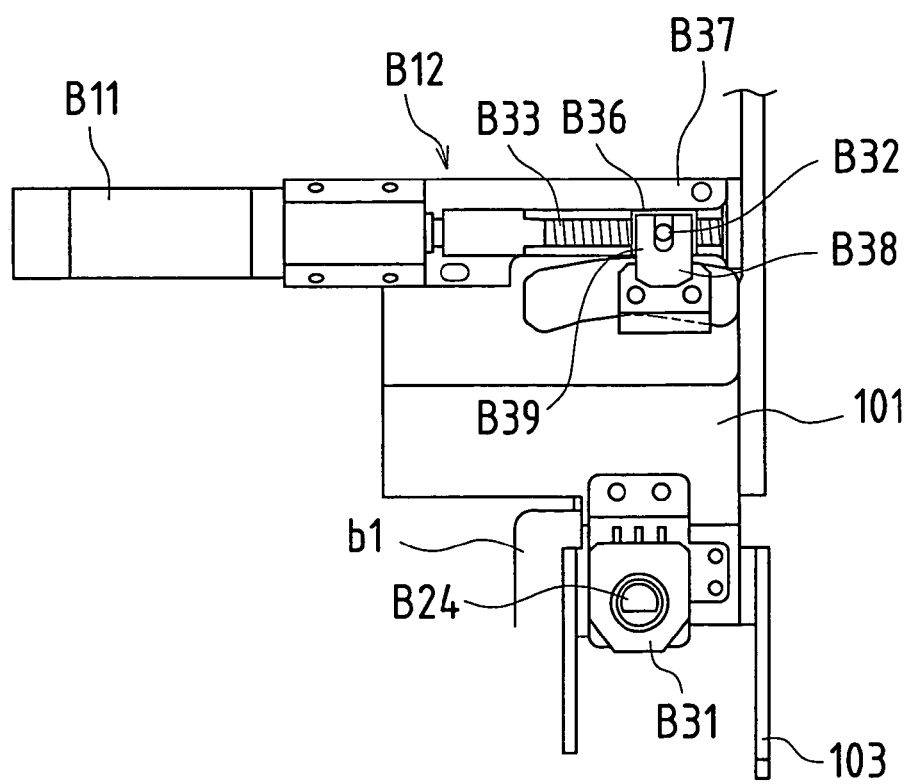
FIG. 9 is a partial cut-away view showing a location where an index finger sub base and main base are linked in the robot hand according to the present embodiment.

Specifically, the direct-acting rotational transformer B12 is made up of a screw B33, a yoke B32, a direct-acting unit B36, and so on, as shown in FIG. 9. The direct-acting rotational transformer B12 rotates the screw B33 by transmitting the rotation of an output shaft of the motor B11 to the screw B33. The index finger sub base 103, which is connected to the yoke B32, is rotated by moving the direct-acting unit B36, which is screwed onto the screw B33, in a rectilinear fashion along the screw B33, thereby moving the yoke B32, which engages the direct-acting unit B36.

Figure 10:
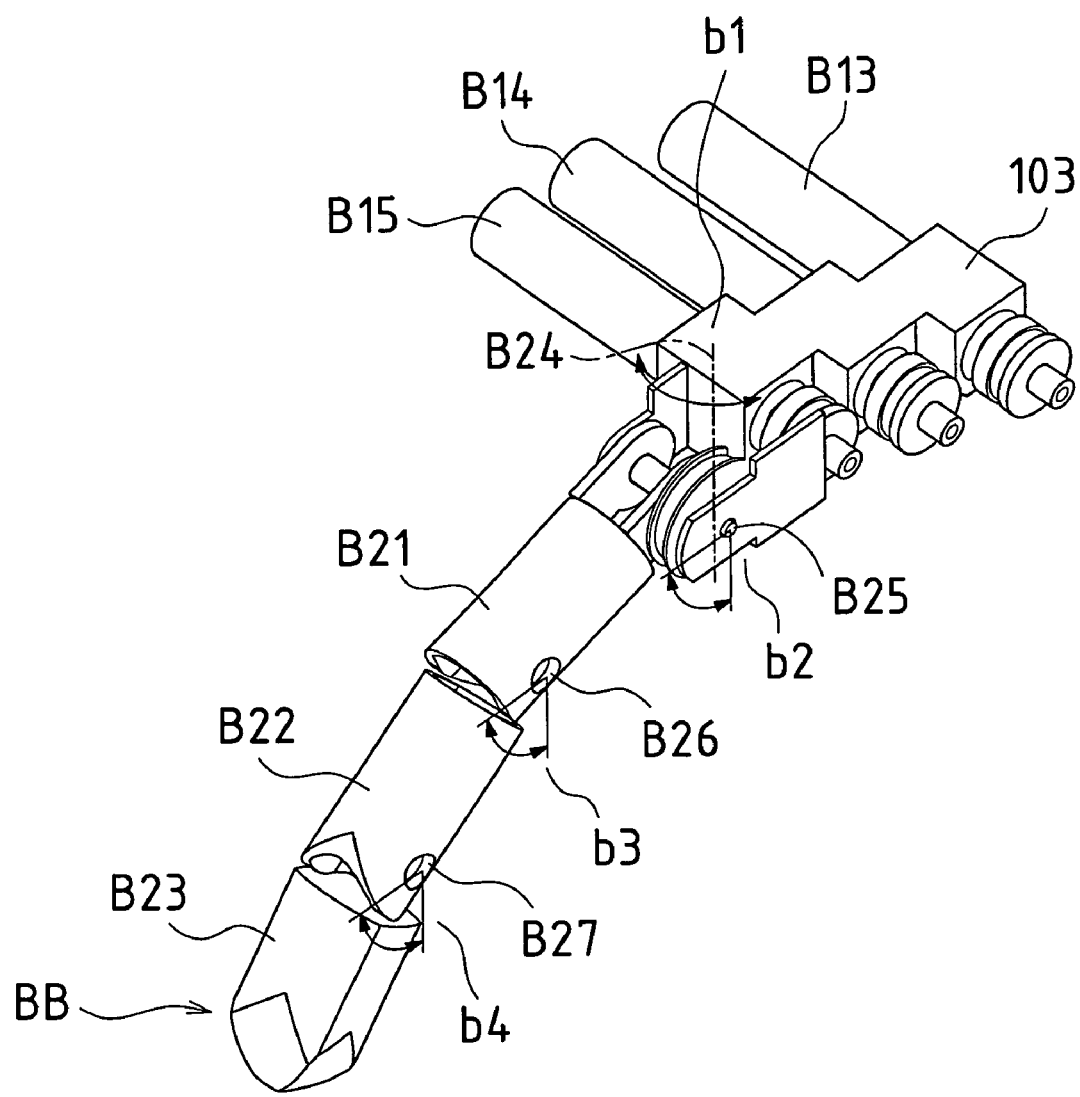
FIG. 10 is a figure showing a bending and extending operation of an index finger in the robot hand according to the present embodiment.

FIG. 10 is a figure showing a bending and extending operation of an index finger in the robot hand according to the present embodiment.

Figure 11:
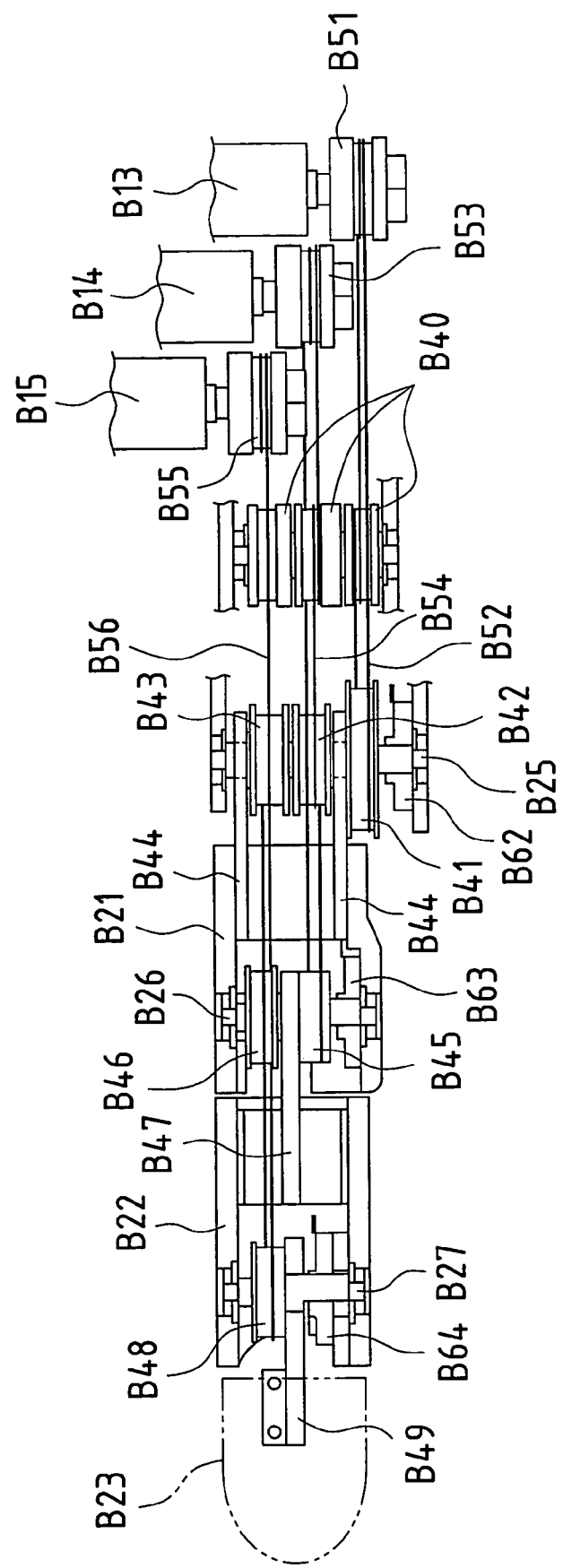
FIG. 11 is a view showing a partial cross-section of motors on the index finger sub base and the index finger mechanism in the robot hand according to the present embodiment.

Pulleys and wires which are shown in FIG. 11 are omitted from FIG. 10.

As shown in FIG. 10, three motors B13, B14, and B15 are mounted on the index finger sub base 103, and the index finger mechanism BB is bent and extended by rotating joints b2, b3, and b4 on the index finger mechanism BB by transmitting to joints b2, b3, and b4 of the index finger mechanism BB the rotation of the output shafts of the motors B13, B14, and B15 via their respective rotation transmission mechanisms.

FIG. 11 is a view showing a partial cross-section of the motors B13, B14, and B15 on the index finger sub base 103 and the index finger mechanism BB.

The index finger mechanism BB is provided with finger barrel portions B21 and B22 and a finger tip portion B23, which are linked by the joints b2, b3, and b4 (see FIG. 10).

A shaft B25, which corresponds to the joint b2, is rotatably supported on the index finger sub base 103. The shaft B25 supports in a fixed manner a driven pulley B41 which rotates together with the shaft B25, and rotatably supports idler pulleys B42 and B43 with respect to the shaft B25 and the driven pulley B41. Link portion B44 on the finger barrel portion B21 is connected in a fixed manner to the driven pulley B41.

When the output shaft of the motor B13 rotates, a motor pulley B51 rotates, the rotation of the motor pulley B51 is transmitted to the idler pulley B40 and the driven pulley B41 via a wire B52, the idler pulley B40 idles, the driven pulley B41 rotates together with the shaft B25 and the link portion B44, and the finger barrel portion B21 rotates around the joint b2.

A shaft B26, which corresponds to the joint b3, is supported at the extremity of the finger barrel portion B21. The shaft B26 supports in a fixed manner the driven pulley B45 which rotates together with the shaft B26, and rotatably supports an idler pulley B46 with respect to the shaft B26 and the driven pulley B45. Link portion B47 on the finger barrel portion B22 is connected in a fixed manner to the driven pulley B45.

When the output shaft of the motor B14 rotates, a motor pulley B53 rotates, the rotation of the motor pulley B53 is transmitted to the idler pulley B40, the idler pulley B42, and the driven pulley B45 via a wire B54, the idler pulleys B40 and B42 idle, the driven pulley B45 rotates together with the shaft B26 and the link portion B47, and the finger barrel portion B22 rotates around the joint b3.

Further, a shaft B27, which corresponds to the joint b4, is supported at the extremity of the finger barrel portion B22. This shaft B27 supports in a fixed manner a driven pulley B48 which rotates together with the shaft B27. Link portion B49 on the finger tip portion B23 is connected in a fixed manner to the driven pully B48.

When the output shaft of the motor B15 rotates, a motor pulley B55 rotates, the rotation of the motor pulley B55 is transmitted to the idler pulley B43, the idler pulley B46, and the driven pulley B48 via the wire B56, the idler pulleys B40, B43, and B46 idle, the driven pulley B48 rotates together with the shaft B27 and the link portion B49, and the finger tip portion B23 rotates around the joint b4.

Accordingly, like the thumb mechanism AA, the index finger mechanism BB individually rotates the four joints b1 through b4 by the four motors B1 and B13 through B15, and has a degree of freedom of 4.

Figure 12:
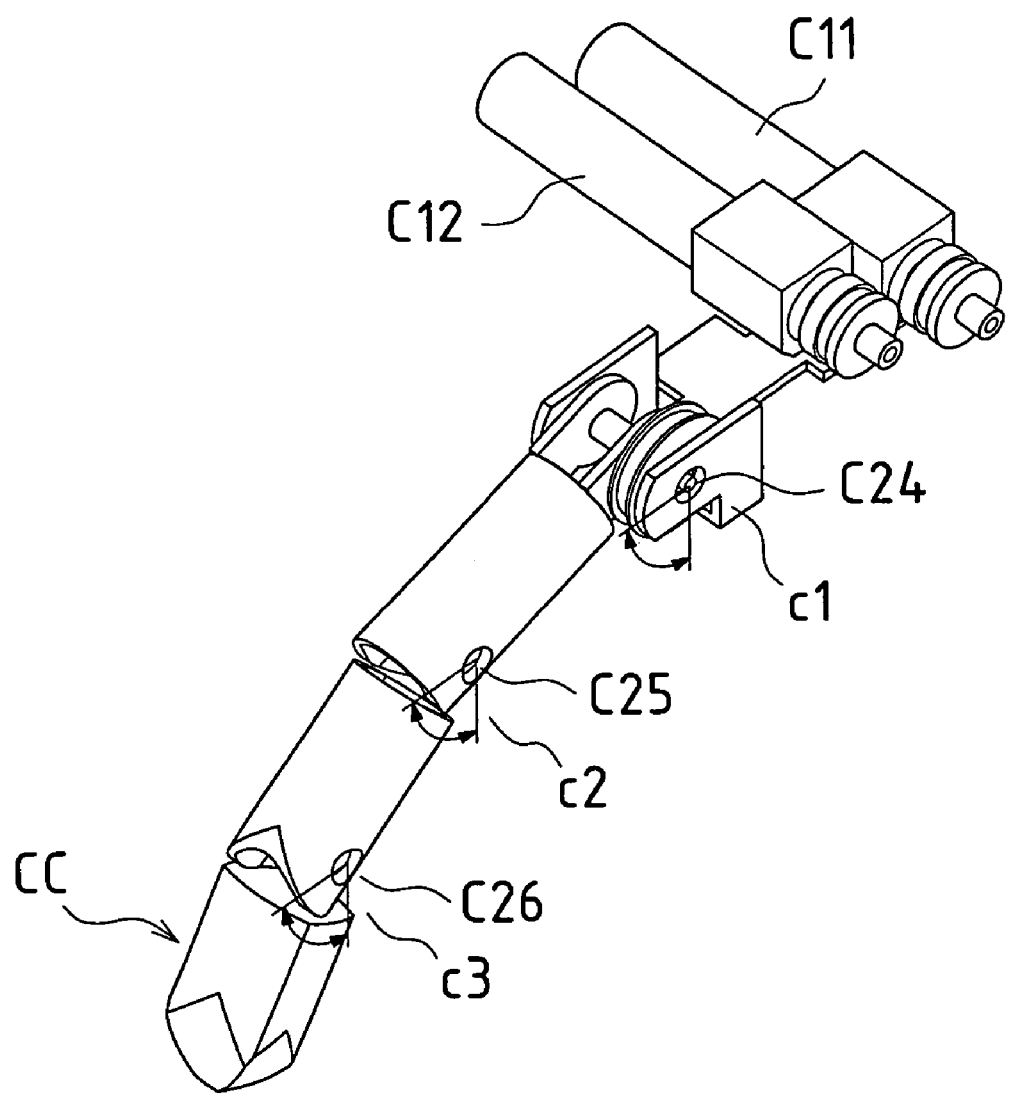
FIG. 12 is a figure showing a bending and extending operation of a middle finger mechanism in the robot hand according to the present embodiment.

A middle finger mechanism CC is described next. FIG. 12 is a figure showing a bending and extending operation of the middle finger mechanism in the robot hand according to the present embodiment. Pulleys and wires which are shown in FIG. 13 are omitted from FIG. 12.

Two motors C1 and C12 are mounted on the main base 101, as shown in FIG. 12, rotation of output shafts of the motors C11 and C12 is transmitted to joints c1 and c2 of the a middle finger mechanism CC via their respective rotation transmission mechanisms, thereby rotating the joints c1 and c2, the rotation of the joint c2 further being transmitted to a joint c3 via a rotation transmission mechanism, thereby drivenly rotating the joint c3 and bending and extending a middle finger C.

Figure 13:
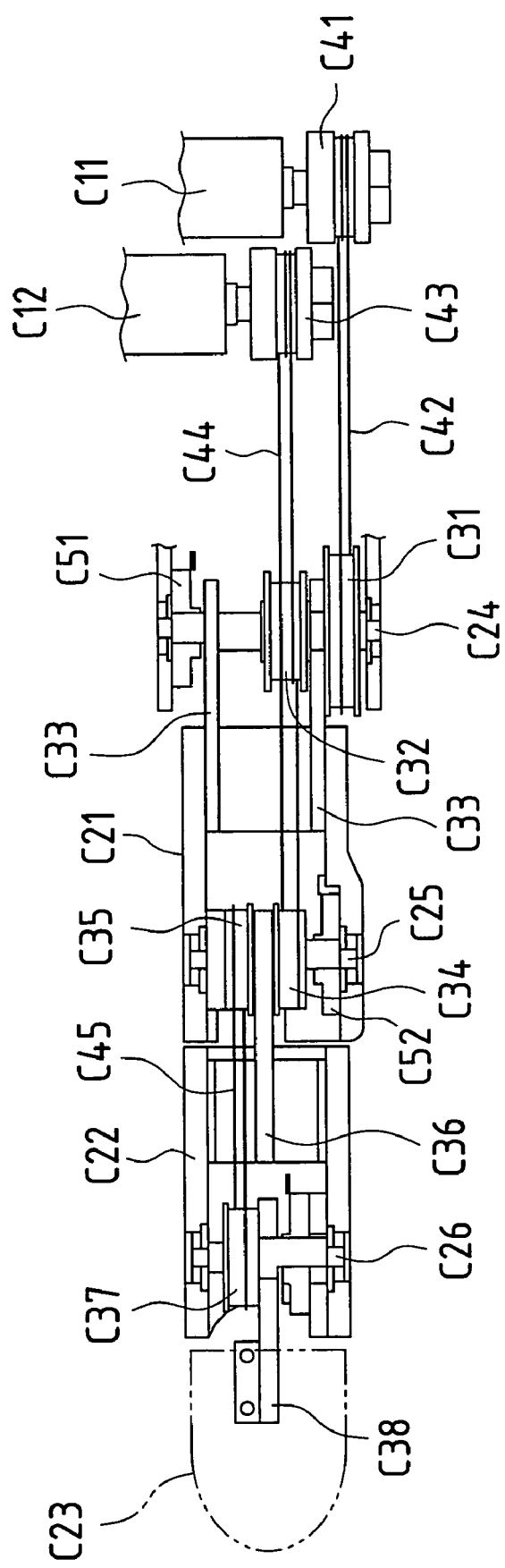
FIG. 13 is a view showing a partial cross-section of motors on the main base and the middle finger mechanism in the robot hand according to the present embodiment.

FIG. 13 is a view showing a partial cross-section of the motors C11 and C12 on the main base 101 and the middle finger mechanism CC.

The middle finger mechanism CC is provided with finger barrel portions C21 and C22 and a finger tip portion C23 which are linked by the joints c1 and c2.

A shaft C24, which corresponds to the joint c1, is rotatably supported on the main base 101. The shaft C24 supports in a fixed manner the driven pulley C31 which rotates together with the shaft C24, and rotatably supports an idler pulley C32 with respect to the shaft C24 and the driven pulley C31. Link portion C33 on the finger barrel portion C21 is connected in a fixed manner to the driven pulley C31.

When the output shaft of the motor C11 rotates, a motor pulley C41 rotates, the rotation of the motor pulley C41 is transmitted to the driven pulley C31 via a wire C42, the driven pulley C31 rotates together with the shaft C24 and the link portion C33, and the finger barrel portion C21 rotates around the joint c1.

A shaft C25, which corresponds to the joint c2, is supported at the extremity of the finger barrel portion C21. This shaft C25 supports in a fixed manner a driven pulley C34, which rotates together with the shaft C25, and a driving force transmission pulley C35. Link portion C36 on the finger barrel portion C22 is connected in a fixed manner to the driven pulley C34.

When the output shaft of the motor C12 rotates, a motor pulley C43 rotates, the rotation of the motor pulley C43 is transmitted to the idler pulley C32 and the driven pulley C34 via a wire C44, the idler pulley C32 idles, the driven pulley C34 rotates together with the shaft C25 and the link portion C36, and the finger barrel portion C22 rotates around the joint c2.

Further, a shaft C26, which corresponds to the joint c3, is supported at the extremity of the finger barrel portion C22. A driven pulley C37, which rotates together with the shaft C26, is connected in a fixed manner to this shaft C26. Link portion C38 on the finger tip portion C23 is connected in a fixed manner to the driven pulley portion C37.

When the driving force transmission pulley C35 rotates together with the driven pulley C34 of the joint c2, the rotation of the driving force transmission pulley C35 is transmitted to the driven pulley C37 via the wire C45. The driven pulley C37 rotates together with the shaft C26 and the link portion C38, and the finger tip portion C23 rotates around the joint c2. In other words, the joint c3 drivenly rotates with respect to the joint c2.

Accordingly, the middle finger C individually rotates the two joints c1 and c2 by the two motors C11 and C12, and has a degree of freedom of 2.

Figure 14:
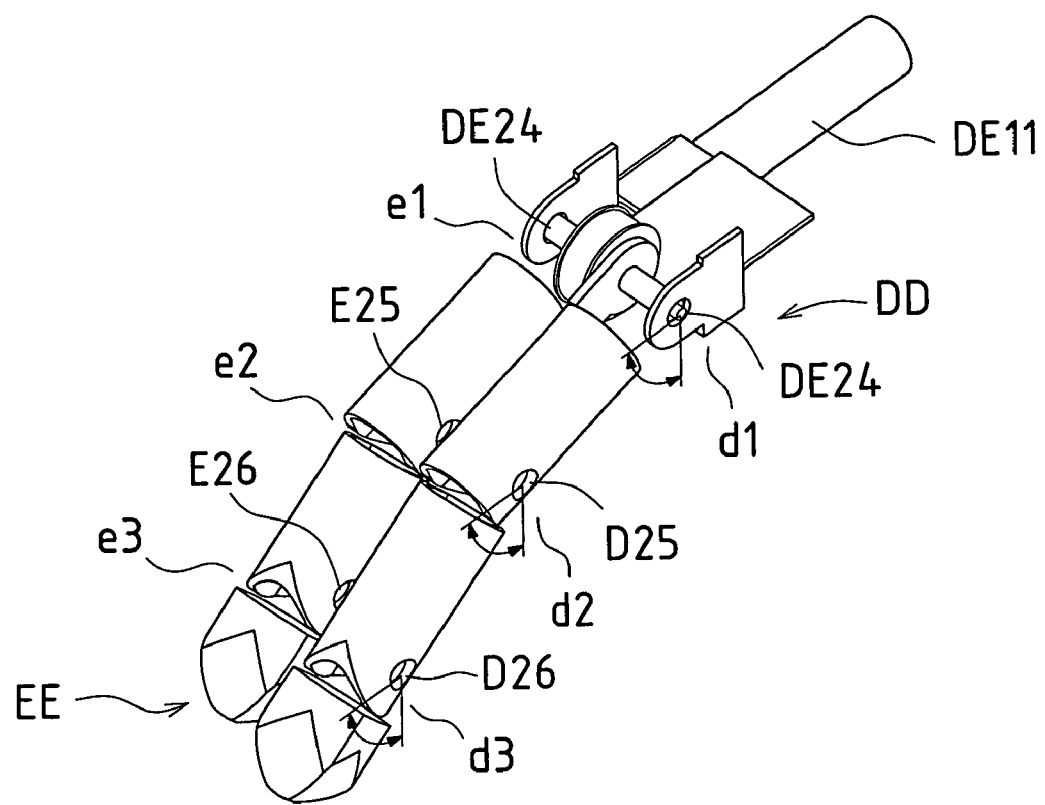
FIG. 14 is a figure showing a bending and extending operation of a ring finger mechanism and a little finger mechanism in the robot hand according to the present embodiment.

A ring finger mechanism DD and a little finger mechanism EE are described next. FIG. 14 is a figure showing a bending and extending operation of the ring finger mechanism and the little finger mechanism in the robot hand according to the present embodiment. Pulleys and wires which are shown in FIG. 15 are omitted from FIG. 14.

A motor DE11 is mounted on the main base 101 as shown in FIG. 14, rotation of an output shaft of the motor DE11 is transmitted to joints d1 and d2 of the ring finger mechanism DD and joints e1 and e2 of the little finger mechanism EE via their respective rotation transmission mechanisms, thereby rotating the joints d1 and d2 of the ring finger mechanism DD and the joints e1 and e2 of the little finger mechanism EE and bending and extending the ring finger mechanism DD and the little finger mechanism EE.

Figure 15:
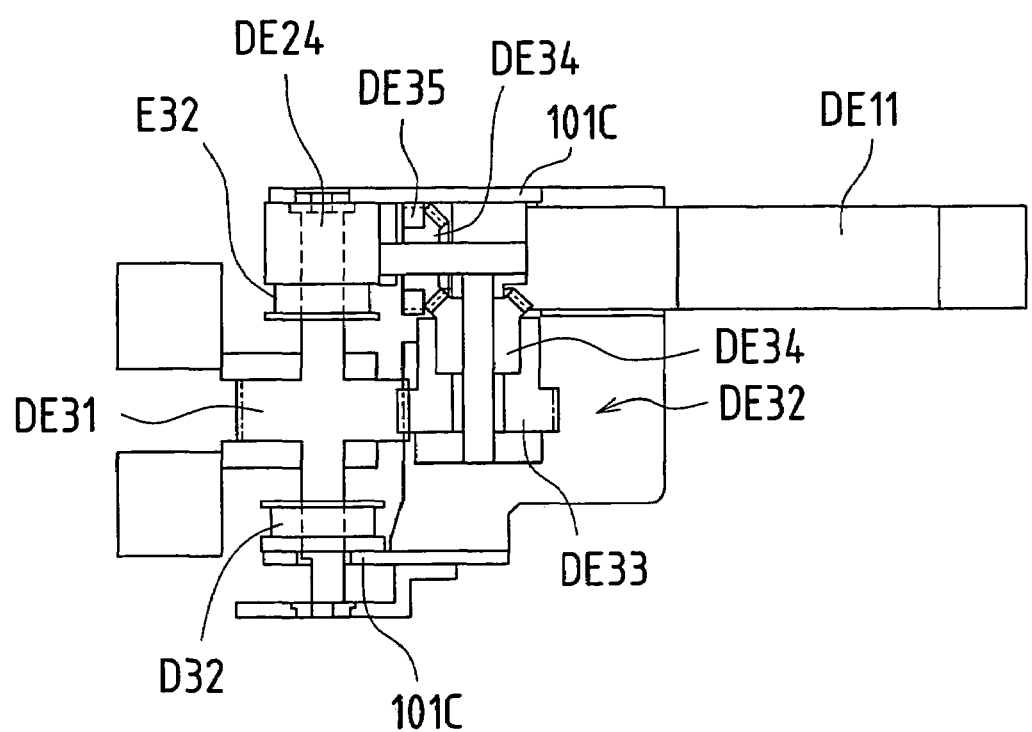
FIG. 15 is a partial cut-away view showing a location where the ring finger mechanism and the little finger mechanism are linked to the main base in the robot hand according to the present embodiment.

FIG. 15 is a cross-section view showing a partial cut-away of the area around the motor DE11 on the main base 101.

A shaft DE24, which corresponds to the joints d1 and e2 (see FIG. 14), is rotatably supported on the main base 101. A gear DE31 is supported in a fixed manner on the shaft DE24, and a pair of pulleys D32 and E32 are rotatably passed therethrough. These pulleys D32 and E32 are fixed to respective supporting portions 101c. A gear box DE32 intermeshes a gear DE33, bevel gears DE34, a gear DE35, and so on. By connecting the gear DE35 to the output shaft of the motor DE11, the rotation of the output shaft is transmitted to the gear DE33 via the gear DE35 and the bevel gears DE34, and the gear DE31, which intermeshes with the gear DE33, thereby rotates.

Figure 16:
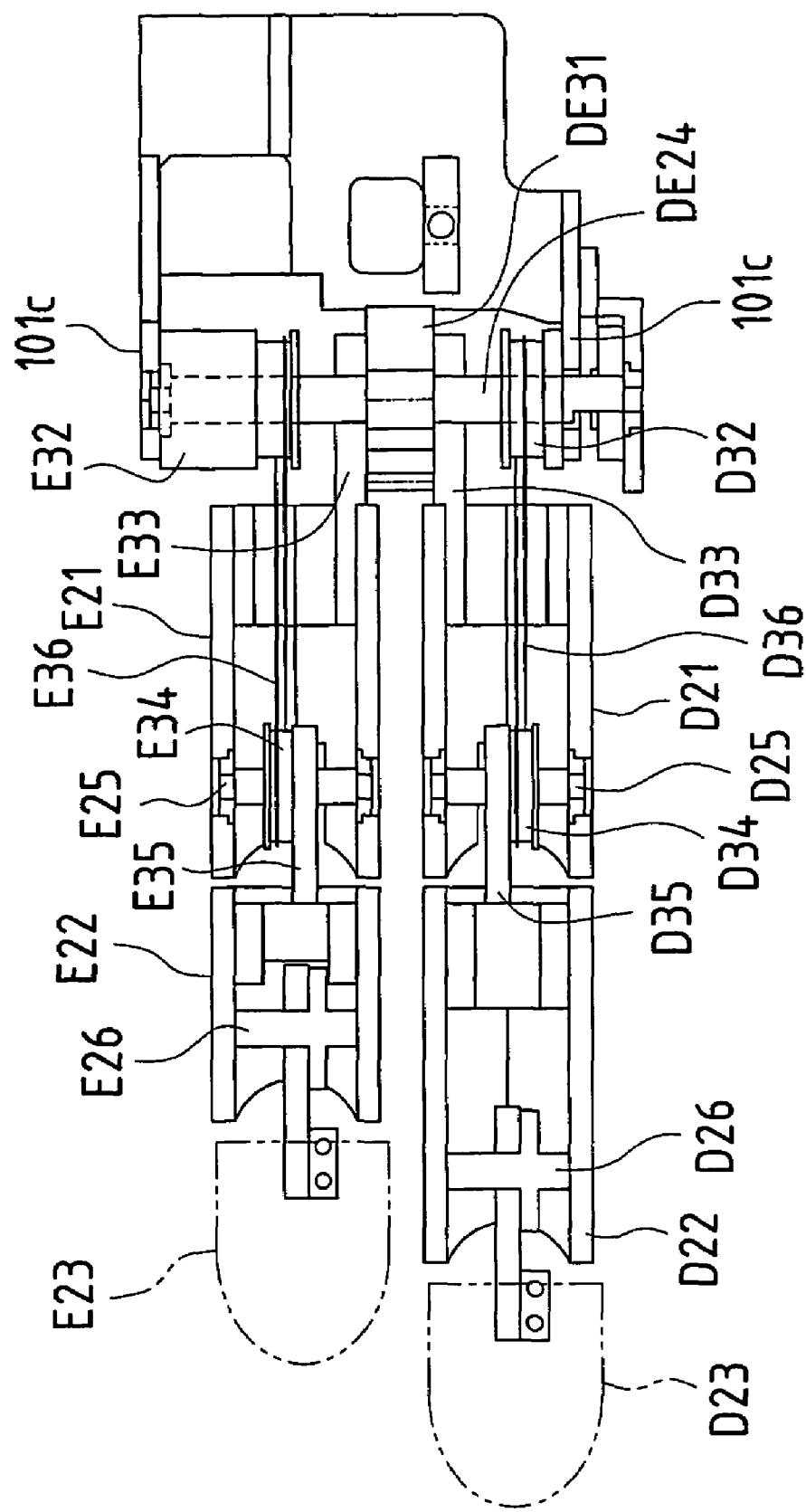
FIG. 16 is a view showing a partial cross-section of motors on the main base, the ring finger mechanism, and the little finger mechanism in the robot hand according to the present embodiment.

FIG. 16 is a view showing a partial cross-section of the shaft DE24, the ring finger mechanism DD and the little finger mechanism EE on the main base 101.

The ring finger mechanism DD is provided with finger barrel portions D21 and D22 and a finger tip portion D23, which are linked by the joints d1 and d2 (see FIG. 14). The little finger mechanism EE is provided with finger barrel portions E21 and E22 and a finger tip portion E23, which are linked by the joints e1 and e2.

Link portions D33 and E33 of the finger barrel portions D21 and E21 are connected in a fixed manner to the gear DE31 of the shaft DE24.

A shaft D25, which corresponds to the joint d2, is supported at the extremity of the finger barrel portion D21. A driven pulley D34, which rotates together with the shaft D25, is connected in a fixed manner to this shaft C25. Link portion D35 on the finger barrel portion D22 is connected in a fixed manner to the driven pulley D34.

Similarly, a shaft E25, which corresponds to the joint e2, is supported at the extremity of the finger barrel portion E21. A driven pulley E34, which rotates together with the shaft E25, is connected in a fixed manner to this shaft E25. Link portion E35 of the finger barrel portion E22 is connected in a fixed manner to the driven pulley E34.

When the output shaft of the motor DE11 turns, the rotation of the output shaft is transmitted to the gear DE31 via the gearbox DE32, the gear DE31 turns, and the finger barrel portion D21 also rotates around the joint d1.

Although the wire D36 revolves around the shaft DE24 as the finger barrel portion D21 rotates around the joint d1, the pulley D32 which is fixed to the supporting portions 101c does not rotates, so the wire D36 either is wound by the pulley D32 or is released and the driven pulley D34 rotates together with the shaft D25 and the linking portion D35, whereby the finger barrel portion D22 rotates around the joint d2. Accordingly, the finger barrel portions D21 and D22 rotate simultaneously. As regards the finger barrel portions E21 and E22 and the finger tip portion E23, similarly to the finger barrel portions D21 and D22 and the finger tip portion D23, wires E36 stretch across the pulley E32 on the shaft DE24 and the driven pulley E34 on the shaft E25, so when the output shaft of the motor DE11 rotates, the finger barrel portion E21 rotates around the joint e1, and the finger barrel portion E22 rotates around the joint e2.

Accordingly, the ring finger mechanism DD and the little finger mechanism EE have a degree of freedom of 1, as the joints d1 and d2 in the ring finger mechanism DD and the joints e1 and e2 in the little finger mechanism EE are rotated by the one motor DE11.

With this type of the robot hand 10, the thumb mechanism AA and the index finger mechanism BB have a degree of freedom of 4, the middle finger mechanism CC has a degree of freedom of 2, and the ring finger mechanism DD and the little finger mechanism EE have a degree of freedom of 1, so the degree of freedom of the robot hand 10 itself is 11.

Moreover, the plurality of motors which drive the finger mechanisms AA though EE are connected to a control circuit (not shown) via respective lines (not shown), and rotate by being controlled by this control circuit. The joints thereby rotate and the finger mechanisms AA through EE bend and extend.

Each joint in the finger mechanisms AA through EE is provided with a potentiometer for detecting the rotation angle of the joint. Each potentiometer is connected to the above-mentioned control circuit via the lines. The control circuit rotates each joint in the finger mechanisms AA through EE such that the rotation angle of the joint detected by the potentiometer achieves a target value, thereby operating the finger mechanisms AA through EE in a variety of manners.

The finger tip portion A23, the finger tip portion B23, the finger tip portion C23, the finger tip portion D23, the finger tip portion E23, and so on, of the finger mechanisms AA through EE are each provided with force sensors for detecting forces acting on the various finger tip portions as part of a gripping operation of an object by the robot hand 10. Each force sensor is connected to the above-mentioned control circuit via the lines. The control circuit controls the gripping force and so on of the robot hand 10 by controlling the driving force of each motor, determining the gripping state of the object based on the forces detected by the force sensors. The force sensors may be provided to the finger barrel portions or other portions as well as to the finger tip portions.

Further, drive mechanisms for the fingers of the robot hand 10 may not be limited to combinations of pulleys and wires, but rather combinations of gears and many more combinations have already been proposed, which may be appropriately used as drive mechanisms.

Incidentally, the robot hand 10 according to the present embodiment has a degree of freedom of 11, but is nevertheless unable to perfectly imitate the complex movement of a human hand. Moving an object on the palm of the robot hand 10 with the robot hand 10 gripping the object is therefore an operation of great difficulty.

Figure 17:
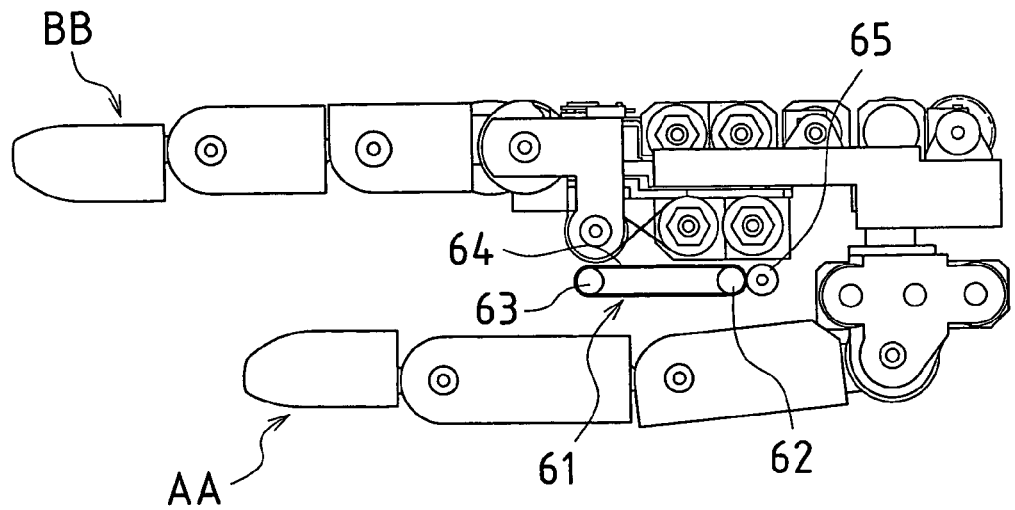
FIG. 17 is a lateral view showing the robot hand according to the present embodiment with a moving mechanism revealed on the palm.
Figure 18:
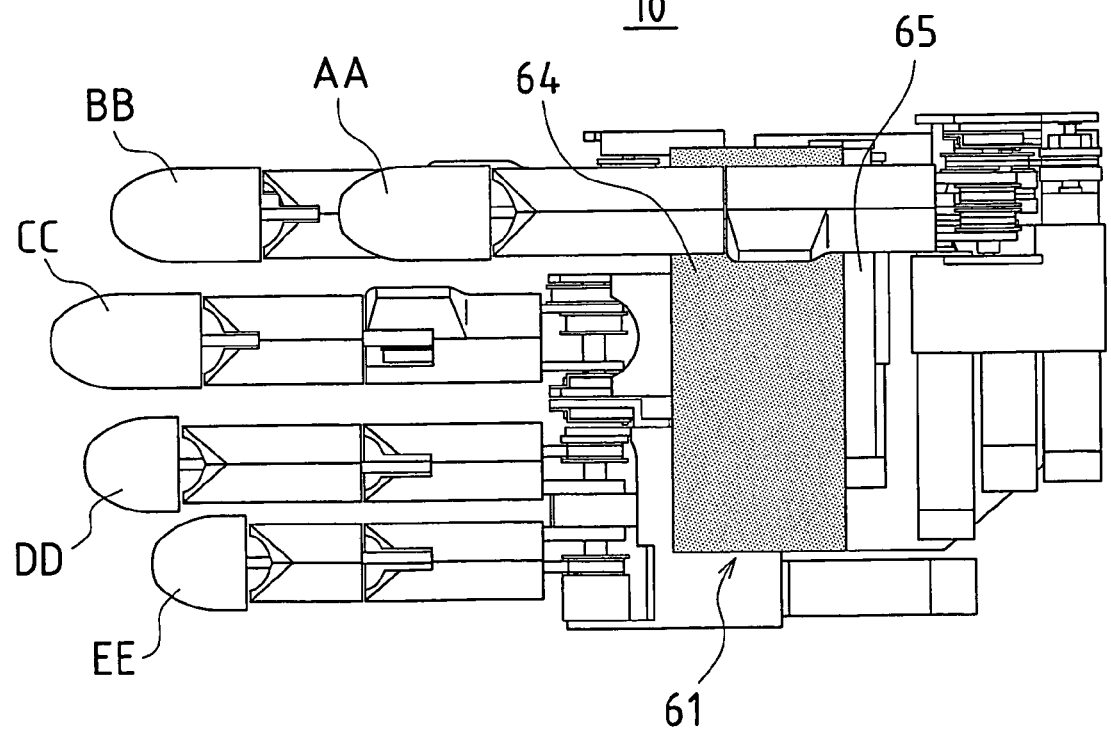
FIG. 18 is a plan view showing the robot hand according to the present embodiment with the moving mechanism revealed on the palm.

Accordingly, the palm of the robot hand 10 is provided with a moving mechanism 61 in the present embodiment as shown in FIG. 17 and FIG. 18. The moving mechanism 61 is represented by a dashed double dotted line in FIG. 1 and FIG. 2.

Figure 19:
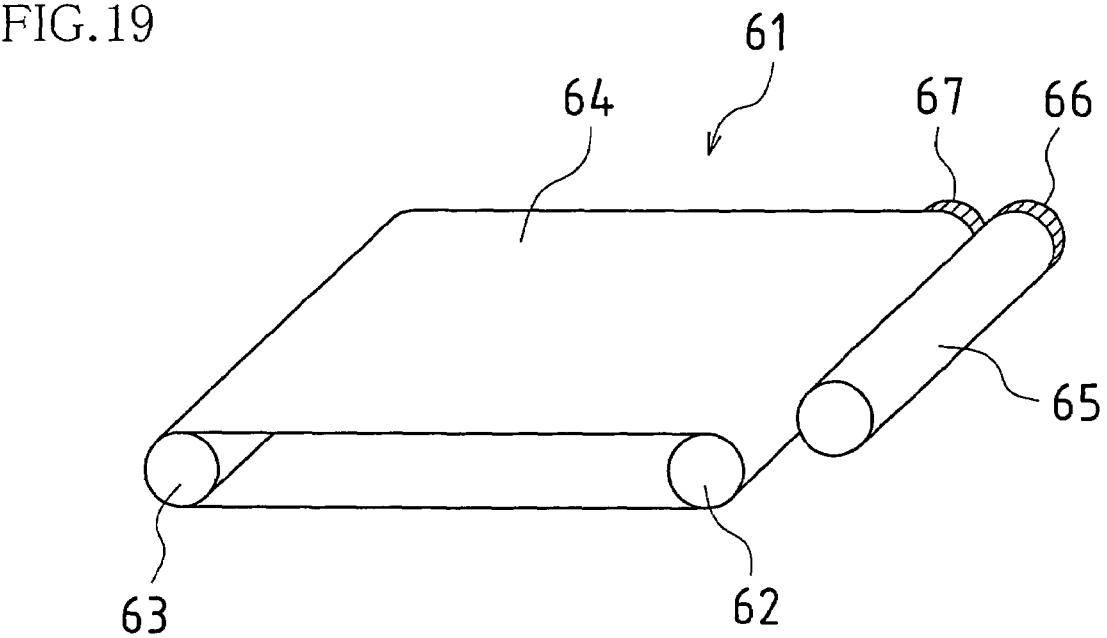
FIG. 19 is a perspective view showing the moving mechanism of FIG. 17 and FIG. 18 in an enlarged manner.

The moving mechanism 61 is a so-called belt conveyor, and, as shown expanded in FIG. 19, a driving roller 62 and a driven roller 63 are arranged separated, an endless belt 64 is supported stretched across the driving roller 62 and the driven roller 63, the driving roller 62 is rotated by the motor 65, thereby rotatedly moving the endless belt 64.

Transmission of the rotational force from the motor 65 to the driving roller 62 is done via a gear 66 on the output shaft of the motor 65 and a gear 67 on the shaft of the driving roller 62, which mutually intermesh. Moreover, the motor 65 is connected to the control circuit (not shown) via a plurality of lines (not shown), and rotates by being controlled by this control circuit.

The motor 65, a shaft bearing (not shown) of the driving roller 62, and a shaft bearing (not shown) of the driven roller 63 may be directly affixed to an appropriate location on the palm of the robot hand 10, and may be affixed to a frame (not shown) which is affixed to the palm of the robot hand 10.

Moreover, the motor 65 is exposed to the exterior, but a cover for protecting the motor 65 may be provided. Providing the cover makes the robot hand 10 thicker, so the cover may be omitted in order to ensure thinness.

Figure 20:
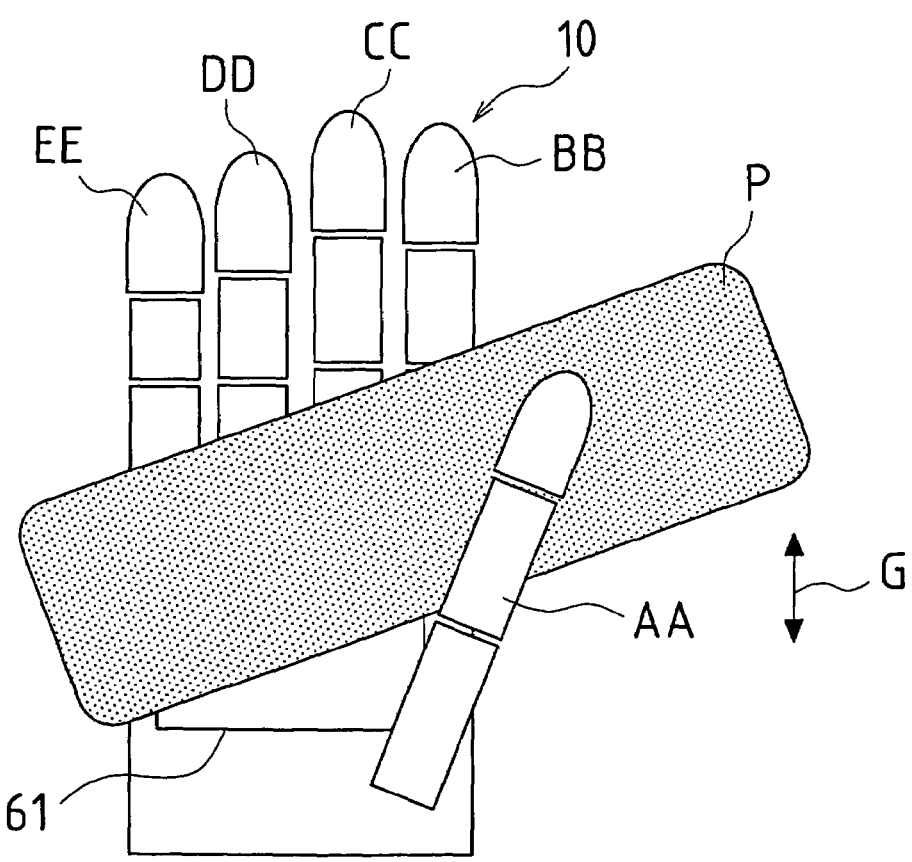
FIG. 20 is a view illustrating how the object moves on the palm of the robot hand by the moving mechanism shown in FIG. 17 and FIG. 18.

On the robot hand 10 of this configuration, the moving mechanism 61 may be provided to the palm of the robot hand 10, making it possible to move an object P by the moving mechanism 61 in the direction of an arrow G with the robot hand 10 gripping the object P as shown in FIG. 20. The object P can thereby be manipulated in a more complex manner compared to a robot hand without the moving mechanism 61. The moving mechanism 61 which is a belt conveyor need simply be added on, so technical feasibility is very high, and control is easy.

According to the present embodiment, the moving direction of the moving mechanism 61 is set as a vertical direction along the palm, but the moving direction may be set to cross the palm horizontally. In this case, the object P is moved in a horizontal direction by the moving mechanism 61 on the palm of the robot hand 10. Alternately, the moving direction of the moving mechanism 61 may be set as a diagonal direction.

Figure 21:
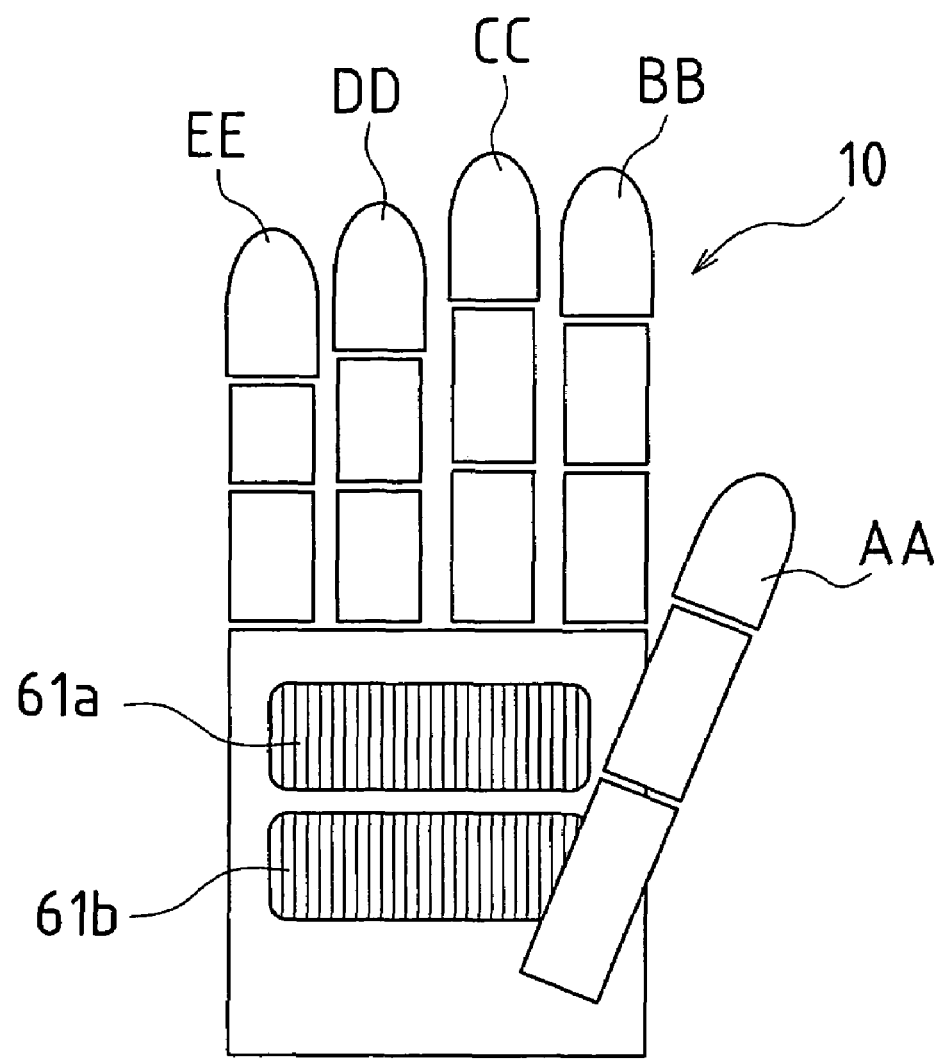
FIG. 21 is a view showing a variation of the moving mechanism used in the present embodiment.

Two moving mechanisms 61a and 61b shown in FIG. 21 may also be provided to the palm. The moving mechanisms 61a and 61b are belt conveyors like the moving mechanism 61. The moving direction by the moving mechanisms 61a and 61b is, however, set to a direction across the palm horizontally.

Figure 22:
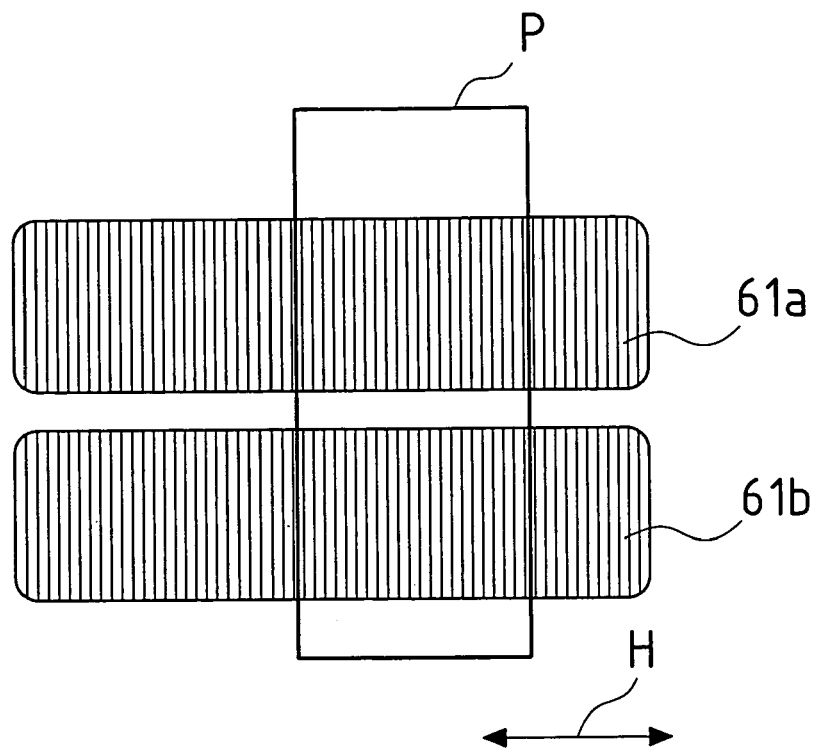
FIG. 22 is a view showing an example of how the object moves on the palm of the robot hand by the moving mechanism of FIG. 21.

In the case in which these two moving mechanisms 61a and 61b are provided, manipulation of objects by the robot hand 10 becomes even more diverse. For example, if the moving direction and the moving speed by the moving mechanisms 61a and 61b match as shown in FIG. 22, the object P can be moved in the direction of an arrow H by the moving mechanisms 61a and 61b, similarly to the single moving mechanism 61.

Figure 23:
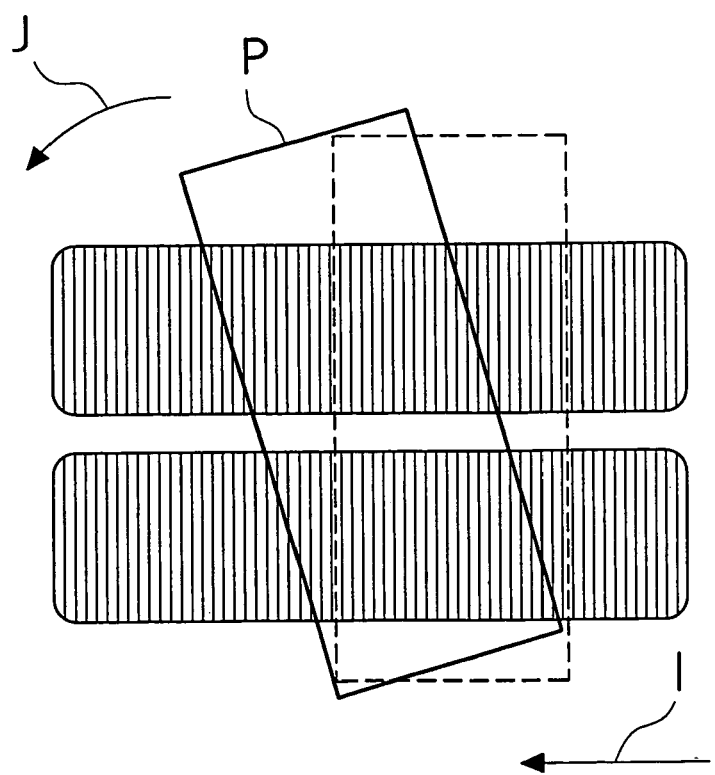
FIG. 23 is a view showing another example of how the object moves on the palm of the robot hand by the moving mechanism of FIG. 21.

If a moving direction I by the moving mechanisms 61a and 61b is matched while a moving speed by the moving mechanism 61a is made faster than a moving speed by the moving mechanism 61b, as shown in FIG. 23, then object P can be moved in the direction of the arrow I while rotating in the direction of an arrow J on the palm, enabling tilting of the object P. Needless to say, adjusting moving speeds by the moving mechanisms 61a and 61b and reversing the moving direction by the moving mechanisms 61a and 61b makes it possible to change the transporting speed, the rotating speed, and so on of the object P.

Alternately, if the moving direction of the moving mechanism 61a and the moving direction of the moving mechanism 61b are made opposite, the object P can be rotated on the palm almost without changing the position on the palm of the object P, thereby tilting the object P.

Figure 24A:
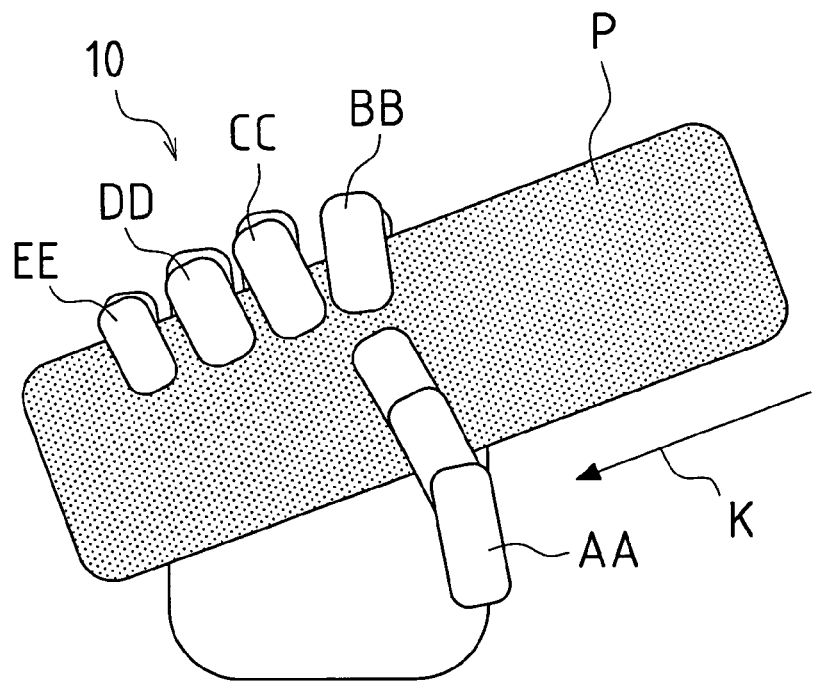
FIG. 24A is a view showing a different example of how the object moves on the palm of the robot hand by the moving mechanism of FIG. 21.
Figure 24B:
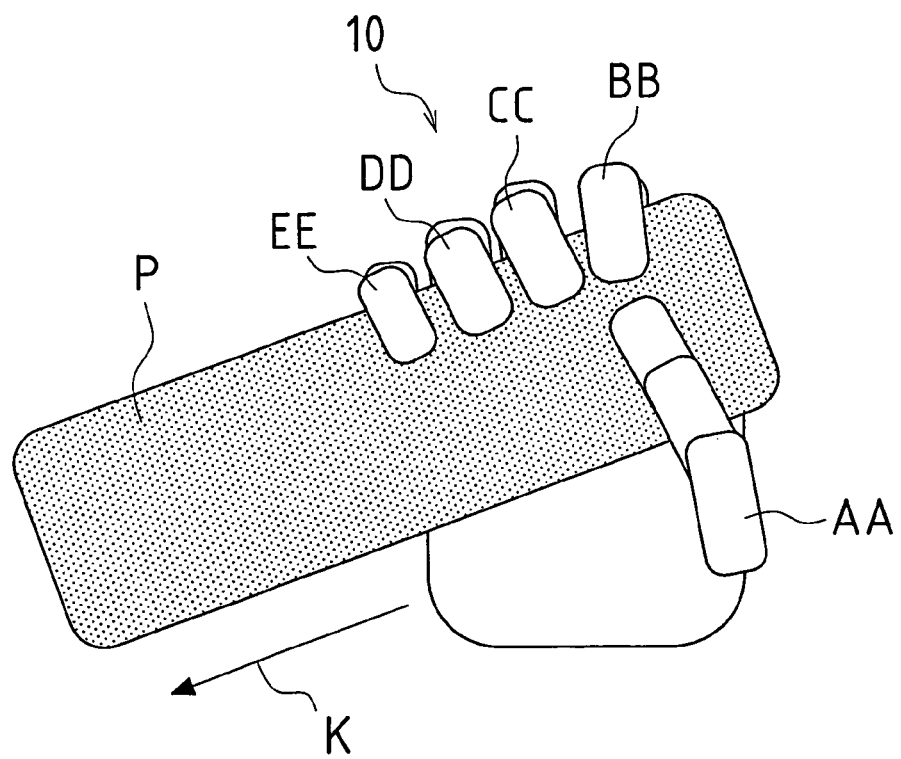
FIG. 24B is similarly a view showing a different example of how the object moves on the palm of the robot hand by the moving mechanism of FIG. 21.

For example, the gripping power of the robot hand 10 can be reduced to the point where the object P does not fall, with the robot hand 10 gripping the object P which is long, as shown in FIG. 24A. A gripping power sufficient for gently pushing the object against the moving mechanisms 61a and 61b is, however, maintained. Thereafter, the moving directions of the moving mechanisms 61a and 61b are matched, the moving speeds by the moving mechanisms 61a and 61b are made different, the object P is moved on the palm while being tilted, the object P is moved in the direction of an arrow K as shown in FIG. 24B, the extremity of the object P is moved to the palm of the hand, and the moving mechanisms 61a and 61b are stopped. With this, the gripping location of the object P on the palm of the robot hand 10 can be moved.

This kind of manipulation of the object P is required, for example, when operating a remote control device for an electrical appliance with the robot hand 10. The remote control device has an oblong shape and buttons arranged over almost all of its top side. Therefore, in order to press all the buttons from one side to the other of the remote control device, the remote control device must be moved and the gripping location changed.

Aside from the above, in order to change to a more stable grip of the oblong object P, the object P need only be moved and rotated by the moving mechanisms 61a and 61b.

Figure 25:
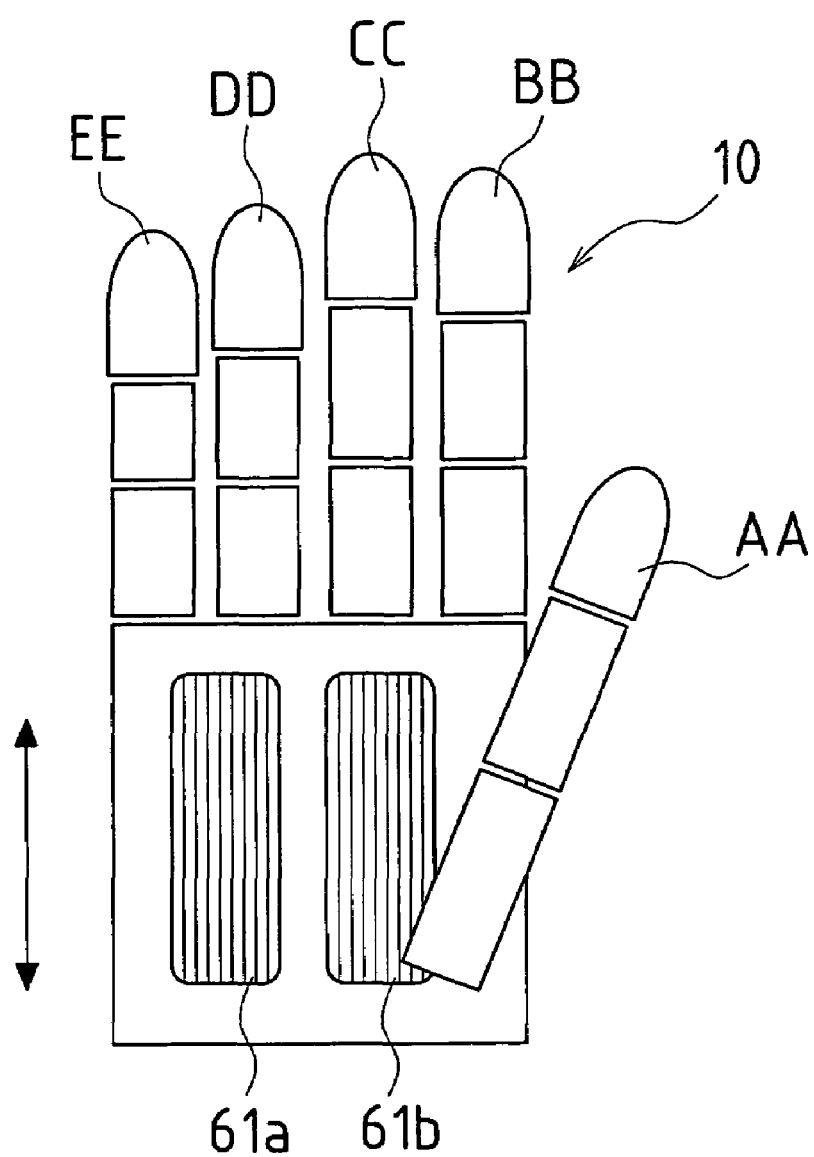
FIG. 25 is a view showing another variation of the moving mechanism used in the present embodiment.

The moving direction by the moving mechanisms 61a and 61b may be set to a vertical direction as shown in FIG. 25, and the object P moved in the vertical direction along the palm of the robot hand 10. Alternately, the moving direction of the moving mechanisms 61a and 61b may be set as a diagonal direction.

Figures 26A, 26B:
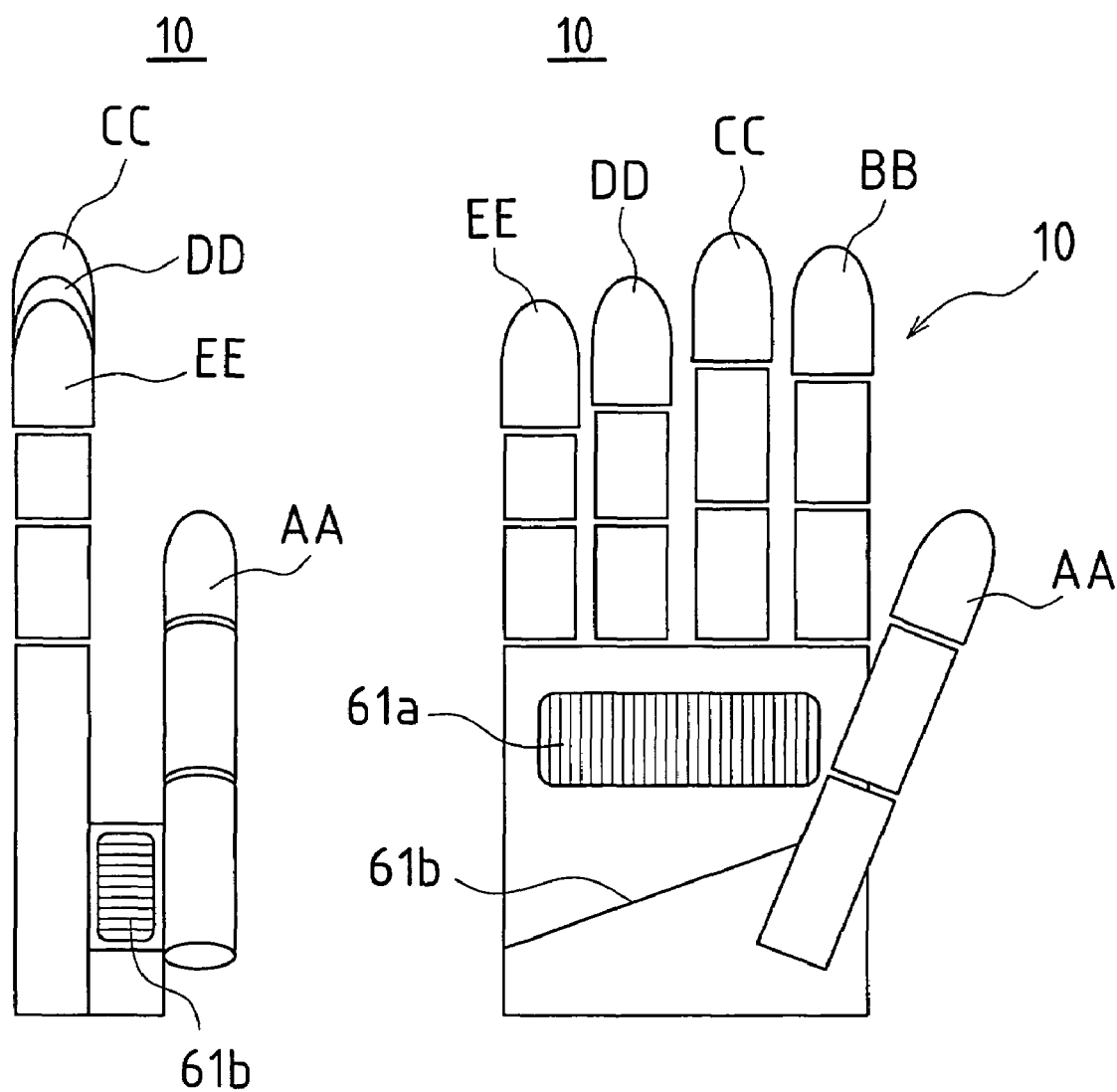
FIG. 26A is a lateral view showing a different variation of the moving mechanism used in the present embodiment.
FIG. 26B is similarly a plan view showing a different variation of the moving mechanism used in the present embodiment.

Further, as shown in FIG. 26A and FIG. 26B, one moving mechanism 61a may be arranged on the palm of the robot hand 10, the other moving mechanism 61b may be arranged near the base of the thumb finger mechanism AA of the robot hand 10, and the moving surfaces of the moving mechanisms 61a and 61b may be made vertical. In this case, the touching of the moving mechanisms 61a and 61b on the respective vertical surfaces of the object increases the touching area between the object and the moving mechanisms 61a and 61b. If the object has a complex shape, touching between the object and the moving mechanisms 61a and 61b can be ensured, thereby ensuring stable moving of the object by the moving mechanisms 61a and 61b.

Further, the number of the moving mechanisms may be increased and the size, shape, and arranged location of each moving mechanism may be changed, thereby making possible more complex manipulation of objects of different shapes and sizes.

Figure 27:
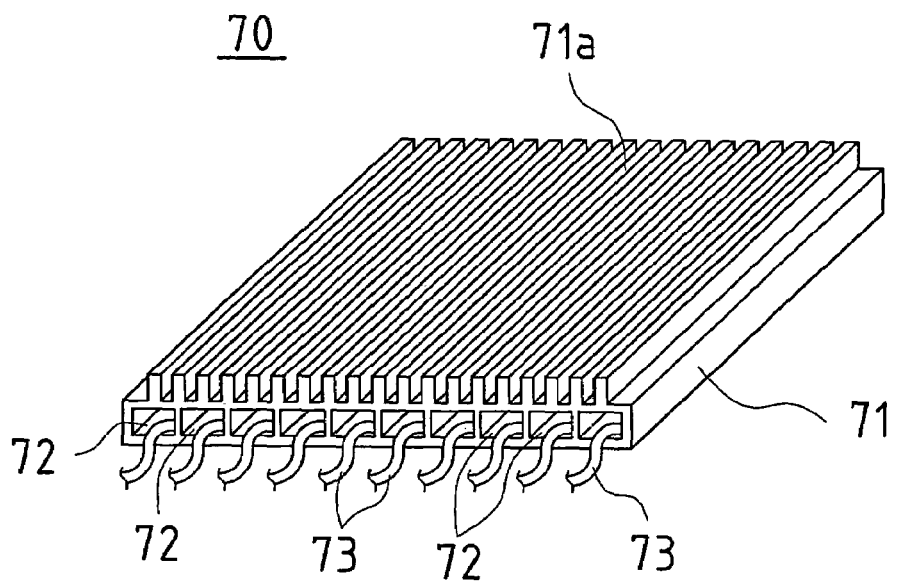
FIG. 27 is a perspective view showing another kind of moving mechanism used in the present embodiment.

Moreover, in the present embodiment, a belt conveyor is used as a moving mechanism, but other types of moving mechanisms may be applied. For example, there is an actuator 70 as shown in FIG. 27. The actuator 70 is formed by lining up a plurality of pressure chambers 72 on a plate-shaped elastic member 71, tubes 73 are connected to the pressure chambers 72, and by feeding air to the pressure chambers 72 and releasing air from the pressure chambers 72 via the tubes 73, the pressure chambers 72 are selectively sequentially expanded and contracted, thereby deforming the elastic member 71, forming progressive waves on a rough surface 71a of the elastic member 71, and thereby transporting objects on the rough surface 71a of the elastic member 71 in a progressing direction and a reverse direction of the progressive waves (see JP H9-79213A, etc.).

This kind of actuator 70 is ideal for mounting on the palm of the robot hand, as it can be made very thinly. Since the material of the actuator 70 is elastic, even if the surface on which it is installed is curved, the actuator 70 can be mounted onto the curved surface without gaps.

Figure 28:
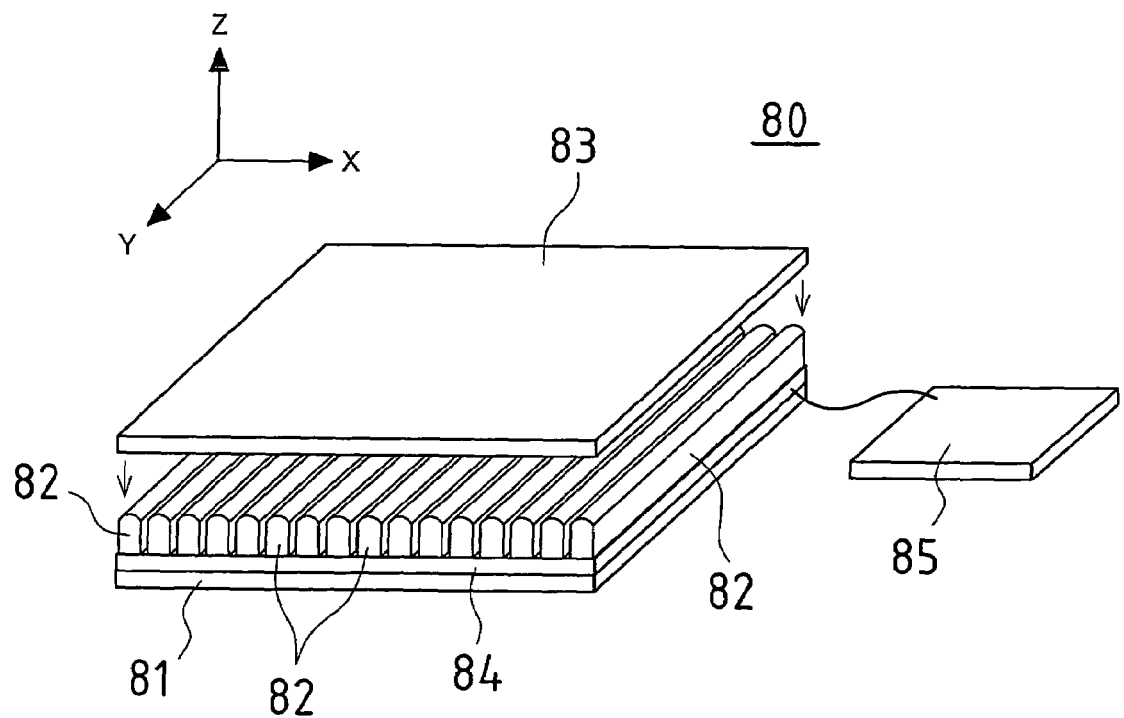
FIG. 28 is a perspective view showing a different kind of moving mechanism used in the present embodiment.

Further, as a moving mechanism, an actuator 80 as shown in FIG. 28 can be applied. With this actuator 80, a flexible substrate 84 is overlaid and affixed to an actuator substrate 81, a plurality of expanding and contracting drive elements 82 is arranged in a line on the flexible substrate 84, a sheet-shaped elastic member 83 is mounted and engaged on a top end of the each expanding and contracting drive element 82, and control drive portions 85 are connected to the expanding and contracting drive elements 82 via the flexible substrate 84. The control drive portion 85 sequentially applies voltage to the expanding and contracting drive elements 82 via the flexible substrate 84, sequentially expanding and contracting the expanding and contracting drive elements 82 in a direction Z, thereby deforming the elastic member 83 such that it undulates, and forming on the surface of the elastic member 83 progressive waves in the direction X, which is the progressing direction. When an object is placed on the elastic member 83, the object is transported in a direction opposite the direction X by the progressive waves on the elastic member 83.

Figure 29A:
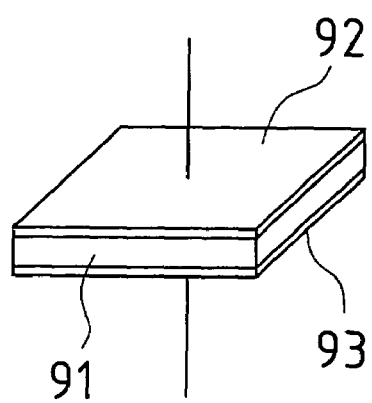
FIG. 29A is a perspective view showing a structure of a polymer actuator used in the present embodiment.
Figure 30:
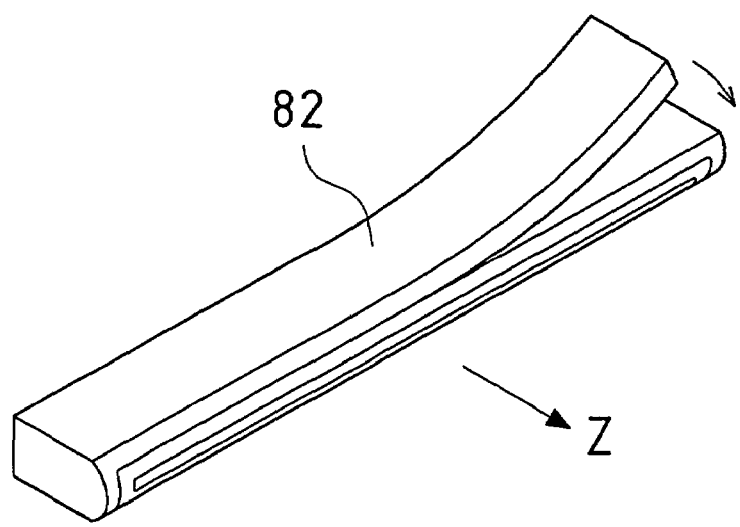
FIG. 30 is a perspective view showing expanding and contracting drive elements formed by rolling the polymer actuator shown in FIG. 29A into the shape of a rectangular bar.

The expanding and contracting drive elements 82 is formed, as shown in FIG. 30, by rolling a polymer actuator in which a sheet-shaped polymer material 91 is sandwiched between a pair of electrodes 92 and 93 as shown in FIG. 29A into a rectangular bar. The polymer material 91 is also known as a dielectric elastomer, an electrostrictive polymer, and so on, and is formed by spin coating, dip coating, casting, or spraying. The electrodes 92 and 93 have flexibility and are formed through a manufacturing method similar to that of the polymer material 91.

Figure 29B:
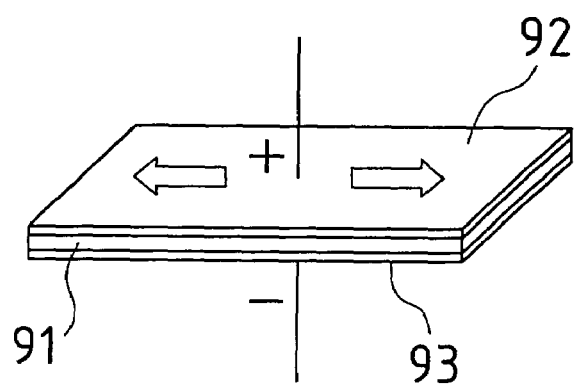
FIG. 29B is a perspective view showing operation of the polymer actuator.

When voltage is applied to the electrodes 92 and 93, an electrostatic force arises between the electrodes 92 and 93, and this electrostatic force acts to broaden the polymer material 91 as shown in FIG. 29B, and the polymer material 91 and the electrodes 92 and 93 extend, the expanding and contracting drive elements thereby lengthening.

When the application of the voltage between the electrodes 92 and 93 stops, the electrostatic force between the electrodes 92 and 93 disappears, the polymer material 91 and the electrodes 92 and 93 return to their original state as shown in FIG. 29A, and the length of the expanding and contracting drive elements returns to as it was.

This type of polymer actuator is described in detail on pp. 32–38 of the January, 2001 issue of *Erekutoronikusu Jisso Gijutsu* published by Gicho Publishing & Advertising Co., Ltd. as well as on pp. 836–837 of vol. 287 of the April (February), 2000 issue of *Science* published by the Saiensu-Sha Co., Ltd.

This kind of actuator 80 has a simple configuration and can be made thin in its entirety, and can thereby be mounted even in small spaces. The speed of response of the polymer actuator is fast, so the speed of the progressive waves can be made faster, and the moving speed of objects can be increased.

Further, if the expanding and contracting drive elements 72 are arranged in rows or in a variety of arrangement patterns and the expansion and contraction order of the expanding and contracting drive elements 72 is set appropriately, the object can be moved vertically and horizontally and rotated.

There exist expanding and contracting drive elements in which take advantage of the fact that when electrodes are provided to the polymer material and voltage is applied, it intakes ions and expands, and these may be used. Alternately, as long as an actuator can be controlled electrically and has similar properties to those of the polymer actuator, any kind of drive elements may be used. There also exist expanding and contracting drive elements which create ultrasonic waves on the surface of the elastic member, thereby transporting objects.

Figure 31:
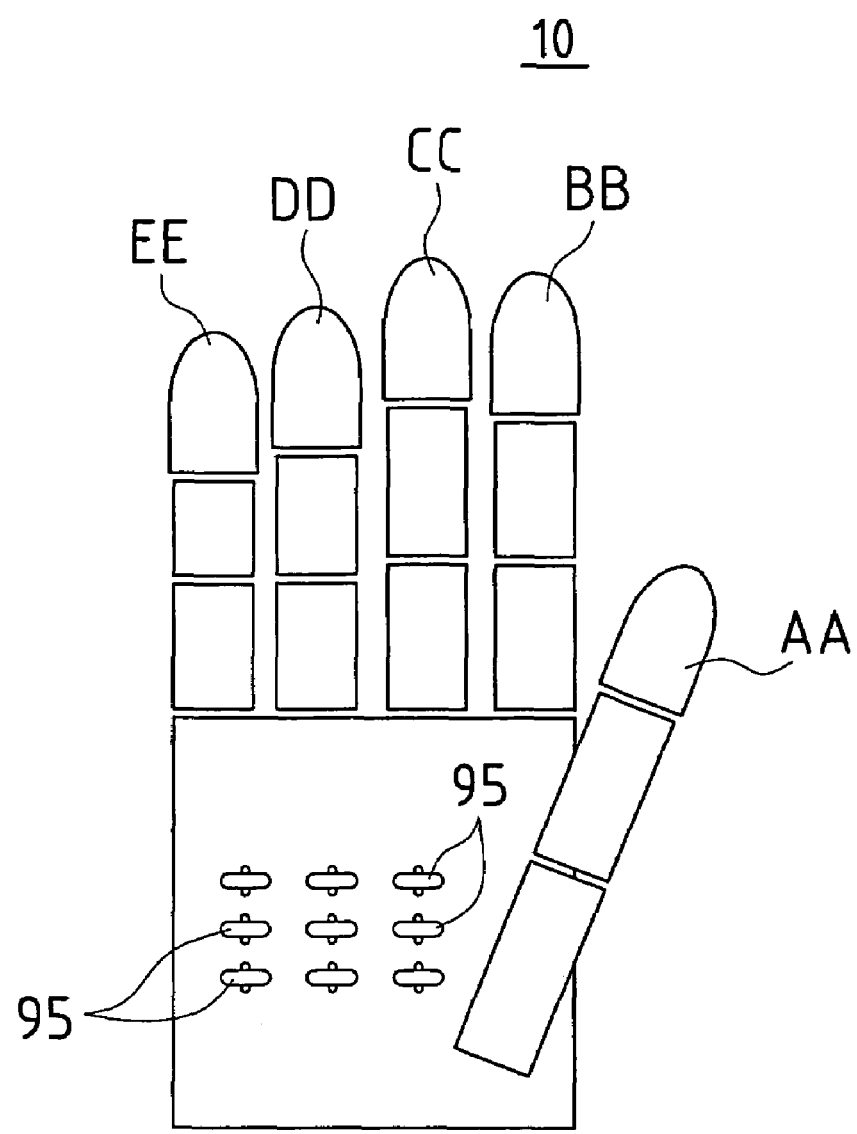
FIG. 31 is a perspective view showing yet another kind of moving mechanism used in the present embodiment.
Figure 32:
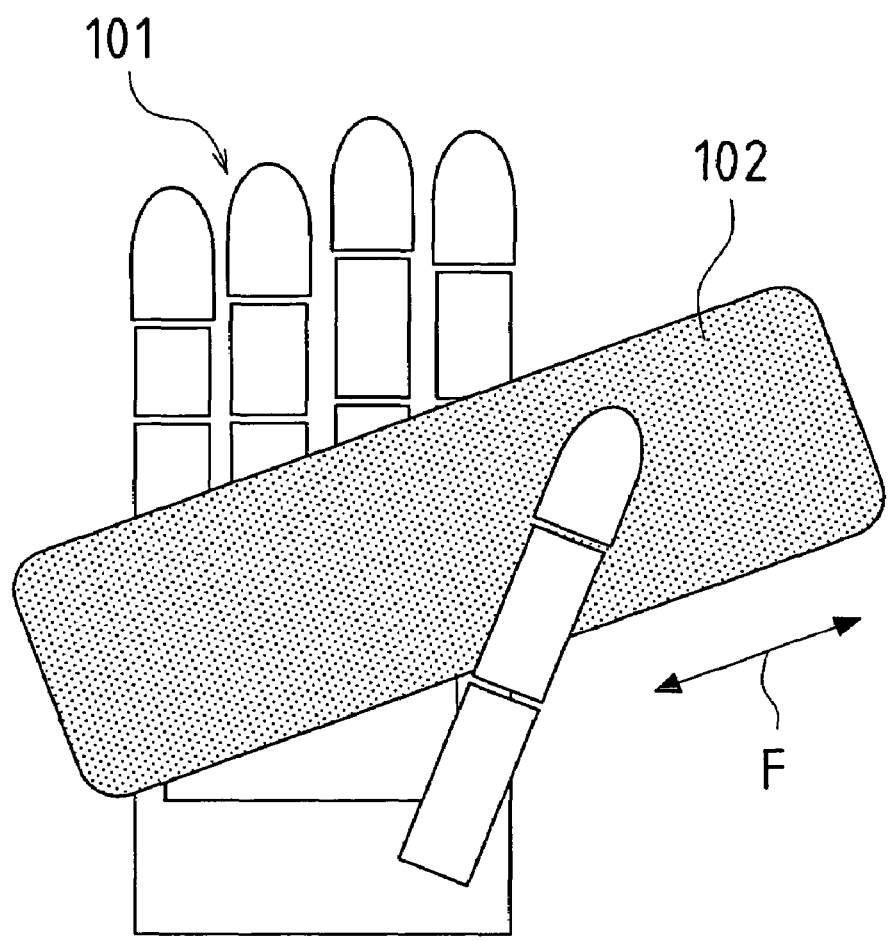
FIG. 32 is a view illustrating a grasping operation of the object by a conventional robot hand.

Further, a plurality of rollers 95 arranged on the palm of the robot hand 10 as shown in FIG. 31 may be used as the moving mechanism. The rollers 95 are rotatedly driven by a motor (not shown), thereby moving the object on the palm by the rollers 95. Not all of the rollers 95 need to rotatedly drive, and instead some of the rollers 95 may be driven.

Note that the present invention is no limited to the above embodiment, and may be varied in many ways. For example, the various types of moving mechanisms described above may be used in combination. The moving mechanisms may be provided to the cushions of the fingers and so on, and not just the palm.

In this way, the present invention may include numerous other embodiments without departing from its spirit or main characteristics. Therefore, the embodiments described are nothing more than simple examples, and must not be interpreted in a limiting manner. The scope of the invention is indicated by the appended claims rather than by the foregoing description. All variations and modifications falling within the equivalency range of the appended claims are intended to be embraced therein.

What is claimed is:

1. A robot hand, comprising:
a main base,
a plurality of articulating fingers attached to said main base, and
at least one moving means disposed at a location on said main base and/or said plurality of fingers of said robot hand for touching and/or moving an object with respect thereto,
wherein a plurality of said moving means is provided such that moving speeds imparted to said object by each said moving means are mutually different from one another.

2. A robot hand, comprising:
a main base,
a plurality of articulating fingers attached to said main base, and at least one moving means disposed at a location on said main base and/or said plurality of fingers of said robot hand for touching and/or moving an object with respect thereto,
wherein a plurality of said moving means is provided such that directions of movement imparted to said object by each said moving means are mutually different from one another.

3. A robot hand, comprising:
a main base,
a plurality of articulating fingers attached to said main base, and at least one moving means disposed at a location on said main base and/or said plurality of fingers of said robot hand for touching and/or moving an object with respect thereto,
wherein the moving means is a belt conveyor.

4. A robot hand, comprising:
a main base,
a plurality of articulating fingers attached to said main base, and at least one moving means disposed at a location on said main base and/or said plurality of fingers of said robot hand for touching and/or moving an object with respect thereto,
wherein said moving means is provided with elastic members that each contain a plurality of pressure chambers such that traveling waves can be formed on the respective surfaces of the elastic members by the sequential selective expansion of each of said pressure chambers, and such that an object touching the surfaces of the elastic members can be moved by said traveling waves relative to the surfaces of said elastic members.

5. A robot hand, comprising:
a main base,
a plurality of articulating fingers attached to said main base, and at least one moving means disposed at a location on said main base and/or said plurality of fingers of said robot hand for touching and/or moving an object with respect thereto,
wherein said moving means is provided with elastic members placed on polymer actuators and latched together such that traveling waves can be formed on the surfaces of said elastic members by sequential selective extension of each said polymer actuator, and such that an object, touching the surfaces of said elastic members can be moved by said traveling waves relative to the surfaces of said elastic members.

6. A robot hand, comprising:
a main base,
a plurality of articulating fingers attached to said main base, and at least one moving means disposed at a location on said main base and/or said plurality of fingers of said robot hand for touching and/or moving an object with respect thereto,
wherein the moving means is a rotatingly driven roller.

* * * * *